United States Patent
Sniady et al.

(10) Patent No.: US 9,458,298 B2
(45) Date of Patent: Oct. 4, 2016

(54) METHODS FOR MAKING LIGNOCELLULOSE CONTAINING COMPOSITE PRODUCTS

(71) Applicant: Georgia-Pacific Chemicals LLC, Atlanta, GA (US)

(72) Inventors: Adam K. Sniady, Lilburn, GA (US); Cornel Hagiopol, Lilburn, GA (US); Derek L. Atkinson, Lawrenceville, GA (US); Bobby L. Williamson, Conyers, GA (US); John B. Hines, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 272 days.

(21) Appl. No.: 14/040,791

(22) Filed: Sep. 30, 2013

(65) Prior Publication Data
US 2014/0090577 A1    Apr. 3, 2014

Related U.S. Application Data

(60) Provisional application No. 61/708,395, filed on Oct. 1, 2012.

(51) Int. Cl.
| | | |
|---|---|---|
| *C08J 5/18* | (2006.01) |
| *B29D 7/01* | (2006.01) |
| *C08H 8/00* | (2010.01) |
| *C08H 7/00* | (2011.01) |
| *C09J 197/00* | (2006.01) |
| *C08L 97/02* | (2006.01) |

(52) U.S. Cl.
CPC .. *C08J 5/18* (2013.01); *B29D 7/01* (2013.01); *C08H 6/00* (2013.01); *C08H 8/00* (2013.01); *C08L 97/02* (2013.01); *C09J 197/005* (2013.01)

(58) Field of Classification Search
CPC .............. B29D 7/01; C08J 5/18; C08H 6/00
See application file for complete search history.

(56) References Cited

U.S. PATENT DOCUMENTS

| | | | |
|---|---|---|---|
| 6,291,558 B1 * | 9/2001 | Raskin et al. ................... | 524/13 |
| 2005/0011621 A1 * | 1/2005 | Westermark ............. | D21J 3/00 |
| | | | 162/9 |

* cited by examiner

*Primary Examiner* — Alexander Polyansky
(74) *Attorney, Agent, or Firm* — Ram W. Sabnis

(57) ABSTRACT

Methods for making composite products are provided. In at least one specific embodiment, the method can include combining a plurality of lignocellulose substrates and one or more free radical precursors to produce a mixture of the lignocellulose substrates and the one or more free radical precursors. The method can also include maintaining the mixture at a temperature less than 60° C. for at least 10 minutes while retaining at least 11 wt % of the one or more free radical precursors charged to the mixture. The method can then include heating the mixture comprising at least 11 wt % of the one or more free radical precursors charged to the mixture to a temperature of at least 60° C. to about 300° C. to produce a composite product. The composite product can have a density less than 1 g/cm$^3$ and an internal bond strength of at least 0.35 MPa.

20 Claims, No Drawings

US 9,458,298 B2

METHODS FOR MAKING LIGNOCELLULOSE CONTAINING COMPOSITE PRODUCTS

CROSS-REFERENCE TO RELATED APPLICATION

This application claims priority to U.S. Provisional Patent Application having Ser. No. 61/708,395, filed Oct. 1, 2012, which is incorporated by reference herein.

BACKGROUND

1. Field

Embodiments described herein generally relate to methods for making lignocellulose containing composite products. Embodiments described herein also generally relate to catalysts for use in making lignocellulose containing composite products.

2. Description of the Related Art

The production of lignocellulose composite products requires an adhesive or binder to bond the discrete, particulates, fibers, veneers, or other substrates to one another. Typical lignocellulose composite products include particleboard, fiberboard, plywood, and the like. Conventional binders used in the production of these products frequently contain formaldehyde based resins such as urea-formaldehyde (UF), melamine-formaldehyde (MF), melamine-urea-formaldehyde (MUF), and phenol-formaldehyde (PF) binders. While formaldehyde based resins produce finished products having desirable properties, such as strength, these binders also release formaldehyde into the environment during the production of the binder, curing of the binder/composite product, as well as, from the final product made using the binder.

Various techniques have been used to reduce the amount of formaldehyde released from formaldehyde based resins. For example, the addition of formaldehyde scavengers to the resin and/or various modifications to the particular synthesis steps used to make the formaldehyde based resin, such as the addition of urea as a reactant late in the binder synthesis, are often used in an attempt to reduce formaldehyde emission. These attempts to reduce formaldehyde emission, however, are accompanied with undesirable effects such as longer cure time, reduced resin shelf-life, reduced product strength, reduced tolerance for processing variations, and/or inferior moisture resistance.

There is a need, therefore, for improved methods for making lignocellulose containing composite products having reduced or no formaldehyde emission.

SUMMARY

Methods for making composite products are provided. In at least one specific embodiment, the method can include combining a plurality of lignocellulose substrates and one or more free radical precursors to produce a mixture of the lignocellulose substrates and the one or more free radical precursors. The method can also include maintaining the mixture at a temperature less than 60° C. for at least 10 minutes while retaining at least 11 wt % of the one or more free radical precursors charged to the mixture. The method can then include heating the mixture comprising at least 11 wt % of the one or more free radical precursors charged to the mixture to a temperature of at least 60° C. to about 300° C. to produce a composite product. The composite product can have a density less than 1 $g/cm^3$ and an internal bond strength of at least 0.35 MPa.

In at least one specific embodiment, the method for making a composite product can include combining a plurality of lignocellulose substrates, one or more free radical precursors, and one or more compounds comprising at least two hydrogen atoms that are abstractable in the presence of hydroxyl radicals to produce a mixture. The method can also include heating the mixture comprising at least 11 wt % of the one or more free radical precursors charged to the mixture to a temperature of at least 60° C. to about 300° C. to produce a composite product.

In at least one specific embodiment, a composite product can include an at least partially cured composition having a density less than 1 $g/cm^3$ and an internal bond strength of at least 0.35 MPa. The composition, prior to curing, can include a plurality of lignocellulose substrates, one or more free radical precursors, and one or more compounds comprising at least two hydrogen atoms that are abstractable in the presence of hydroxyl radicals.

DETAILED DESCRIPTION

The plurality of lignocellulose substrates and the one or more free radical precursors can be mixed, blended, stirred, contacted, or otherwise combined with one another to produce the mixture. One or more compounds comprising at least two hydrogen atoms that are abstractable in the presence of hydroxyl radicals can optionally be combined with the lignocellulose substrates and the free radical precursor and, if present, the catalyst to produce the mixture. The mixture can also be referred to as a "furnish," "blended furnish," "resinated mixture," or "resinated furnish." The mixture can be heated to produce the lignocellulose containing composite product or "composite product." For example, the mixture can be heated to a temperature from a low of 60° C., about 90° C., about 120° C., about 150° C., or about 160° C. to a high of about 170° C., about 200° C., about 230° C., about 260° C., or about 300° C. to produce the composite product. In another example, the mixture can be heated to a temperature of at least 60° C., at least 70° C., at least 80° C., at least 90° C., at least 100° C., at least 110° C., at least 120° C., at least 130° C., or at least 140° C. to about 150° C., about 155° C., about 160° C., about 165° C., about 170° C., about 180° C., about 200° C., about 225° C., about 250° C., about 275° C., or about 300° C. In another example, the mixture can be heated to a temperature of about 140° C. to about 200° C., about 155° C. to about 175° C., about 160° C. to about 210° C., about 160° C. to about 175° C., or about 145° C. to about 225° C.

In one or more embodiments, the mixture can be heated in air. In one or more embodiments, the mixture can be heated in an inert atmosphere or substantially an inert atmosphere such as nitrogen. If the mixture is heated in a substantially inert atmosphere the amount of oxygen can be less than about 5 mol %, less than about 3 mol %, less than about 1 mol %, less than about 0.5 mol %, or less than about 0.1 mol % oxygen. Suitable inert gases can include, but are not limited to, nitrogen, argon, or a mixture thereof.

Heating the mixture can cause or promote the at least partial curing of the mixture to produce the composite product. As used herein, the terms "curing," "cured," "at least partially curing," "at least partially cured," and similar terms are intended to refer to the structural and/or morphological change that occurs in the mixture, such as by covalent chemical reaction (crosslinking), ionic interaction or clustering, phase transformation or inversion, and/or hydrogen bonding when the is subjected to conditions sufficient, e.g., sufficiently heated, to cause the properties of a flexible, porous substrate, such as a nonwoven mat or blanket of lignocellulose substrates and/or a rigid or semi-rigid substrate, such as a wood or other lignocellulose containing board or sheet, to which an effective amount of the free radical precursor and, optionally, the polyphenolic compound has been applied, to be altered.

When the mixture is heated, the mixture can contain at least a portion of the free radical precursor initially added to and present in the mixture. Said another way, at least a portion of the free radical precursor can remain unreacted or otherwise in the same form as when combined with the additional components of the mixture at least until the mixture is heated to an elevated temperature such as about 60° C. or more. For example, if the free radical precursor includes one or more oxidants, e.g., hydrogen peroxide ($H_2O_2$), at least a portion of the oxidant in the form of hydrogen peroxide ($H_2O_2$) can be present when heating of the mixture is initiated or started. In one or more embodiments, the mixture can contain at least 11 wt %, at least 13 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, or at least 70 wt % of the total or initial amount of free radical precursor initially present in the mixture, i.e., the amount of the free radical precursor combined with the plurality of lignocellulose substrates to produce the mixture, when the mixture is heated to a temperature of at least 60° C. In another example, the amount of the free radical precursor present when the mixture is heated to a temperature of at least 60° C. can be at least 11 wt %, at least 13%, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, or at least 70 wt % of the one or more free radical precursors combined with the plurality of lignocellulose substrates. In still another example, the amount of the free radical precursor present when the mixture is heated to a temperature of at least 60° C., at least 65° C., or at least 70° C. can be at least 11 wt %, at least 13%, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, or at least 70 wt % of the one or more free radical precursors combined with the plurality of lignocellulose substrates. In another example, the mixture can contain from about 11% to about 95%, about 15% to about 85%, about 20% to about 90%, about 30% to about 80%, about 11% to about 100%, about 35% to about 75%, about 40% to about 70%, about 50% to about 70%, about 60% to about 80%, about 65% to about 85%, or about 30% to about 95% of the total amount of free radical precursor initially present in the mixture when the mixture is heated. In at least one specific example, if the mixture can include about 5 wt % free radical precursor, based on the dry weight of the lignocellulose substrates when the mixture is initially formed and when the mixture is heated to a temperature of 60° C. or more at least 11% of the free radical precursor can be present in the mixture. Said another way, if the mixture contains about 5 wt % of the one or more free radical precursors, based on the dry weight of the lignocellulose substrates, upon preparation or formation of the mixture, when heating the mixture is initiated or started, the mixture can have a free radical precursor concentration of at least 11% of the initial 5 wt % or 0.55 wt %, based on the dry weight of the lignocellulose substrates.

In one or more embodiments, the amount of the one or more free radical precursors present when the mixture is heated, e.g., to a temperature of about 60° C. to about 300° C., can be at least 0.5 wt %, at least 0.7 wt %, at least 1 wt %, at least 1.2 wt %, at least 1.5 wt %, at least 1.7 wt %, at least 2 wt %, at least 2.2 wt %, at least 2.5 wt %, at least 2.7 wt %, at least 3 wt %, at least 3.2 wt %, at least 3.5 wt %, at least 3.7 wt %, at least 4 wt %, at least 4.2 wt %, at least 4.5 wt %, at least 4.7 wt %, or at least 5 wt %, based on the dry weight of the plurality of lignocellulose substrates. For example, the amount of the one or more free radical precursors present when the mixture is heated can be from a low of about 1 wt %, about 1.5 wt %, about 1.6 wt %, about 1.8 wt %, or about 2.1 wt % to high of about 5 wt %, about 7 wt %, about 10 wt %, about 15 wt %, about 20 wt % or more, based on the dry weight of the plurality of lignocellulose substrates. In another example, the amount of the one or more free radical precursors present when the mixture is heated can be from about 1 wt % to about 10 wt %, about 1.5 wt % to about 7 wt %, about 2 wt % to about 6 wt %, about 2.5 wt % to about 8 wt %, about 3 wt % to about 5.5 wt %, about 4 wt % to about 6.5 wt %, about 2.2 wt % to about 11 wt %, or about 2.3 wt % to about 6.3 wt %, based on the dry weight of the plurality of lignocellulose substrates.

The mixture can be heated as soon as the mixture is formed. The mixture can be kept, held, or otherwise maintained at a temperature less than about 60° C. for a period of time prior to heating the mixture to a temperature of at least 60° C. At least one way an exothermic reaction between the components of the mixture can be substantially and significantly slowed and/or prevented such that the mixture does not significantly increase in temperature until the mixture is intentionally heated can be to select an appropriate free radial precursor or mixture of free radical precursors. In other words, the temperature of the mixture, without external heat directed to the mixture, can remain free from or substantially free from the development of an exotherm by selectively selecting an appropriate free radical precursor(s). The particular temperature of the mixture during the time period before heating can depend, at least in part, on the ambient or environmental temperature where the mixture is located. In one or more embodiments, the mixture can be maintained at a temperature of less than 60° C. without any intentional removal of heat therefrom. In one or more embodiments, the mixture can be maintained at a temperature of less than 60° C. with removal of heat therefrom, e.g., the mixture can be located within a refrigeration device and/or a cooled fluid such as chilled air can be directed toward and/or passed through the mixture. In one or more embodiments, the mixture can be maintained at a temperature of less than 60° C. by controlling or adjusting a water concentration of the mixture. For example, increasing the water concentration of the mixture can reduce, inhibit, or prevent the mixture from undergoing an exothermic reaction.

Prior to heating the mixture to a temperature of at least 60° C., the mixture can be maintained at a temperature less than 60° C., less than 55° C., less than 50° C., less than 45° C., less than 40° C., less than 35° C., or less than 30° C. for at least 10 minutes, at least 13 minutes, at least 15 minutes, at least 17 minutes, at least 20 minutes, at least 23 minutes, at least 25 minutes, at least 27 minutes, at least 30 minutes, at least 33 minutes, at least 35 minutes, at least 37 minutes, at least 40 minutes, at least 43 minutes, at least 45 minutes, at least 47 minutes, at least 50 minutes, at least 53 minutes, at least 55 minutes, at least 57 minutes, or at least 60 minutes. For example, the mixture can be maintained at a temperature less than 60° C. for at least 10 minutes to about 30 minutes, at least about 15 minutes to about 35 minutes, at least about 20 minutes to about 40 minutes, at least about 18 minutes to about 45 minutes, or at least about 15 minutes to about 40 minutes prior to heating the mixture to a temperature of at least 60° C. In another example, the mixture can be maintained at a temperature less than 60° C. for at least 10 minutes, about 30 minutes, about 45 minutes, about 1 hour, about 2 hours, about 3 hours, about 5 hours, about 12 hours, about 18 hours, about 24 hours, or about 30 hours prior to heating the mixture to a temperature of at least 60° C.

Prior to heating the mixture to a temperature of at least 60° C., the amount of energy generated from the mixture due to exothermic reaction(s) can be less than about 35 cal/g of the mixture, less than about 30 cal/g of the mixture, less than about 25 cal/g of the mixture, less than about 23 cal/g of the mixture, less than about 20 cal/g of the mixture, less than about 18 cal/g of the mixture, less than about 16 cal/g of the mixture, less than about 15 cal/g of the mixture, less than about 14 cal/g of the mixture, or less than about 13.8 cal/g of the mixture. For example, prior to heating the mixture to a temperature of at least 60° C., the amount of energy generated from the mixture due to exothermic reaction(s) can be less than 14 cal/g, less than 13.5 cal/g, less than 13 cal/g, less than 12.5 cal/g, less than 12 cal/g, less than 11.5 cal/g, less than 11 cal/g, less than 10.5 cal/g, less than 10 cal/g, less than 9.5 cal/g, less than 9 cal/g, less than 8.5 cal/g, less than 8 cal/g, less than 7.5 cal/g, less than 7 cal/g, less than 6.5 cal/g, less than 6 cal/g, less than 5.5 cal/g, less than 5 cal/g, less than 4.5 cal/g, less than 4 cal/g, less than 3.5 cal/g, less than 3 cal/g, less than 2.5 cal/g. less than 2 cal/g, less than 1.5 cal/g, less than 1 cal/g, or less than 0.5 cal/g of the mixture.

Composite products in the shape or form of a panel, sheet, board, or the like can be in the form of a rectangular prism that includes six outer surfaces, i.e., three pairs of oppositely facing surfaces. The first pair of oppositely facing surfaces of the composite product can include a first or "top" surface and an opposing second or "bottom" surface. The second and third pairs of oppositely facing surfaces of the composite product can be referred to as the "side surfaces" that have a surface area less than the surface area of the first and second surfaces. As such, composite products in the shape or form of a panel, sheet, board, or the like can have an average thickness, where the average thickness is the length or distance between the first and second surfaces.

If the composite product is in the form of a panel, sheet, board, or the like, the amount or length of time the mixture can be heated can range from a low of about 5 seconds per millimeter (s/mm), about 10 s/mm, about 12 s/mm, or about 15 s/mm to a high of about 17 s/mm, about 19 s/mm, about 21 s/mm, about 23 s/mm, about 25 s/mm, about 27 s/mm, about 30 s/mm, about 35 s/mm, about 40 s/mm, about 50 s/mm, or about 60 s/mm, where the length refers to the average thickness of the composite product, and with suitable ranges including the combination of any two values. For example, the mixture can be heated for a time of about 7 s/mm to about 27 s/mm, about 9 s/mm to about 24 s/mm, about 11 s/mm to about 22 s/mm, about 8 s/mm to about 20 s/mm, about 14 s/mm to about 18 s/mm, about 6 s/mm to about 14 s/mm, about 10 s/mm to about 18 s/mm, or about 10 s/mm to about 16 s/mm, where the length refers to the average thickness of the composite product. In another example, the mixture can be heated for a time less than 22 s/mm, less than 20 s/mm, less than 18 s/mm, less than 17 s/mm, less than 16 s/mm, less than 15 s/mm, less than 14 s/mm, less than 13 s/mm, or less than 12 s/mm, where the length refers to the average thickness of the composite product. In one specific example, a composite product in the form of a panel, sheet, board, or the like and having an average thickness of about 15 mm and subjected to a total heating time of about 4 minutes would correspond to heating the mixture for about 16 s/mm. In at least one specific example, the mixture can be heated to a temperature of about 160° C. to about 170° C. for a time of 13 s/mm to about 19 s/mm.

Pressure can optionally be applied to the mixture before, during, and/or after the mixture is heated to produce the composite product. For example, if the desired composite product shape or structure is a panel, sheet, board, or the like, an amount of the mixture sufficient to produce a composite product of the desired size, can be transported, directed, placed, introduced, disposed, or otherwise located within a press capable of pressing the mixture before the mixture is heated and/or when the mixture is heated. The press can be an open press or a closed press. In at least one specific embodiment, an open press can be used to press the mixture when the mixture is heated, e.g., to a temperature of about 100° C. to about 250° C. In another example, the mixture can be extruded through a die (extrusion process) and heated to produce the composite product. The mixture can be pressed under a pressure from a low of about 0.5 MPa, about 1 MPa, about 3 MPa, or about 5 MPa to a high of about 7 MPa, about 9 MPa, or about 11 MPa.

Illustrative open presses can be as discussed and described in U.S. Pat. Nos. 4,017,248; 5,337,655; 5,611,269; 5,950,532; 6,098,532; and 6,782,810. Suitable, commercially available, open presses can include, but are not limited to, the CONTIROLL® press available from Siempelkamp and the CPS press available from Dieffenbacher.

The pH of the mixture can be acidic, neutral, or basic. For example, the pH of the mixture can be from a low of about 1, about 2, or about 3 to a high of about 4, about 5, about 6, about 7, or about 8, with suitable ranges including the combination of any two values. In another example, the pH of the mixture can be from about 1 to about 6, about 1.5 to about 5.5, about 2.5 to about 4.5, about 2 to about 3.5, or about 2.5 to about 3.5. The pH of the mixture can be adjusted to any desired pH by combining one or more base compounds, one or more acid compounds, or a combination of one or more base compounds and one or more acid compounds therewith.

Illustrative base compounds that can be used to adjust the pH of the mixture can include, but are not limited to, hydroxides, carbonates, ammonia, amines, any combination thereof, or any mixture thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

Illustrative acid compounds that can be used to adjust the pH of the mixture can include, but are not limited to, one or more mineral acids, one or more organic acids, one or more acid salts, any combination thereof, or any mixture thereof. Illustrative mineral acids can include, but are not limited to, hydrochloric acid, nitric acid, phosphoric acid, sulfuric acid, any combination thereof, or any mixture thereof. Illustrative organic acids can include, but are not limited to, acetic acid, formic acid, citric acid, oxalic acid, uric acid, lactic acid, any combination thereof, or any mixture thereof. Illustrative acid salts can include, but are not limited to, ammonium sulfate, sodium bisulfate, sodium metabisulfite, any combination thereof, or any mixture thereof.

The mixture can include one or more liquid mediums. The one or more liquid mediums can be present in any one or more of the lignocellulose substrates, the free radical precursor, and/or the optional compound comprising at least two hydrogen atoms that are abstractable in the presence of hydroxyl radicals. The liquid medium can be or include, but is not limited to, water, alcohols, glycols, acetonitrile, dimethyl sulfoxide, N,N-dimethylformamide, N-methylpyrrolidone, any combination thereof, or any mixture thereof. Suitable alcohols can include, but are not limited to, methanol, ethanol, propanol, isopropanol, butanol, any combination thereof, or any mixture thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, other polar aprotic solvents, and the like. In at least one example, the liquid medium can be water and the catalyst, the oxidant, and/or the polyphenolic compound can be combined with water.

The mixture can have a liquid, e.g., water, content from a low of about 1 wt %, about 3 wt %, about 5 wt %, or about 10 wt % to high of about 12 wt %, about 14 wt %, about 16 wt %, about 18 wt %, about 20 wt %, about 22 wt %, or about 24 wt %, based on the total weight of the mixture, with suitable ranges including the combination of any two values. For example, when the mixture contains water as the liquid, the mixture can have a moisture content of about 10 wt % to about 25 wt %, about 12 wt % to about 20 wt %, about 11 wt % to about 19 wt %, about 13 wt % to about 18 wt %, about 15 wt % to about 18 wt %, about 12 wt % to about 17 wt %, or about 14 wt % to about 17 wt %, based on the total weight of the mixture.

The components of the mixture can be combined simultaneously or in any order or sequence with respect to one another. For example, the free radical precursor and, if present, the one or more compounds having at least two hydrogen atoms that are abstractable in the presence of hydroxyl radicals can be combined with the lignocellulose substrates simultaneously. In another example, the free radical precursor can be combined with the lignocellulose substrates to produce a first mixture and then the optional compound having at least two hydrogen atoms that are abstractable in the presence of hydroxyl radicals can be combined with the first mixture to produce the mixture. In another example, the compound having at least two hydrogen atoms that are abstractable in the presence of hydroxyl radicals can be combined with the lignocellulose substrates to produce a first or partial mixture, and then the free radical precursor can be combined with the first or partial mixture to produce the mixture.

If the free radical precursor includes two or more components, e.g., a catalyst and an oxidant, the components of the free radical precursor can be combined with the lignocellulose substrates and the optional compound having at least two hydrogen atoms that are abstractable in the presence of hydroxyl radicals in any order or sequence. For example, if the free radical precursor includes a catalyst and an oxidant, the catalyst can be combined with the lignocellulose substrates to produce a first partial mixture and the oxidant can be combined with the first partial mixture to produce the mixture or vice versa. In another example, the catalyst and the compound having at least two hydrogen atoms that are abstractable in the presence of hydroxyl radicals can be combined with one another to produce a first partial mixture, the first partial mixture can be combined with the lignocellulose substrates to produce a second partial mixture, and the oxidant can be combined with the second partial mixture to produce the mixture. In still another example, the oxidant and the compound having at least two hydrogen atoms that are abstractable in the presence of hydroxyl radicals can be combined with one another to produce a first partial mixture, the first partial mixture can be combined with the lignocellulose substrates to produce a second partial mixture, and the catalyst can be combined with the second partial mixture to produce the mixture. In another example, the oxidant and the catalyst can be combined with one another to produce a first partial mixture, the first partial mixture can be combined with the lignocellulose substrates to produce a second partial mixture, and the compound having at least two hydrogen atoms that are abstractable in the presence of hydroxyl radicals can be combined with the second partial mixture to produce the mixture.

The components of the mixture can be introduced or otherwise contacted with one another via any suitable delivery method. For example, the lignocellulose substrates can be in a vessel or other container and the free radical precursor, and, if present, the compound having at least two hydrogen atoms that are extractable in the presence of hydroxyl radicals can be sprayed or otherwise directed onto the lignocellulose substrates to produce the mixture. In another example, the free radical precursor, and, if present, the compound having at least two hydrogen atoms that are extractable in the presence of hydroxyl radicals can be poured or brushed onto the lignocellulose substrates. In another example, the lignocellulose substrates can be directed, transported, introduced, or otherwise conveyed into a vessel already containing any one or more of the other components of the mixture. Said another way, the lignocellulose substrates can be dipped, soaked, or otherwise contacted with the free radical precursor and, optionally, the compound having at least two hydrogen atoms that are extractable in the presence of hydroxyl radicals.

As used herein, the term free radical precursor refers to any compound or mixture of compounds that can generate radicals when subjected to predetermined conditions. For example, the free radical precursor can be a compound or mixture of compounds that can generate radicals when heated to a predetermined temperature. In another example, the free radical precursor can be a compound or mixture of compounds that can generate radicals when hydrogen peroxide (oxidant) is subjected to reaction with one or more transition metals (catalyst).

The amount of free radical precursor present in the mixture can depend, at least in part, on the particular composition of the free radical precursor, lignocellulose substrates, and/or, if present, the compound having at least two hydrogen atoms that are abstractable in the presence of hydroxyl radicals and, thus, can widely vary. For example, the amount of radical precursor in the mixture can be from about 1 wt % to about 200 wt %, based on the dry weight of the lignocellulose substrates. In another example, the amount of radical precursor in the mixture can be from a low of about 1 wt %, about 5 wt %, about 10 wt %, or about 20 wt % to a high of about 80 wt %, about 100 wt %, about 120 wt %, or about 150 wt %, based on the dry weight of the lignocellulose substrates, with suitable ranges including the combination of any two values. In another example, the radical precursor can be present in the mixture in an amount from about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the radical precursor can be present in the mixture in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates.

In one or more embodiments, the amount of the free radical precursor in the mixture can be about 3 wt %, about 4 wt %, about 5 wt %, about 6 wt %, about 7 wt %, about 8 wt %, about 9 wt %, or about 10 wt % and prior to heating the mixture to a temperature of at least 60° C., the amount of energy generated from the mixture due to any exothermic reaction(s) can be less than about 75 cal/g of the mixture, less than about 69 cal/g of the mixture, less than about 62 cal/g of the mixture, less than about 55 cal/g of the mixture, less than about 48 cal/g of the mixture, less than about 42 cal/g of the mixture, less than about 34 cal/g of the mixture, less than about 27 cal/g of the mixture, less than about 20 cal/g of the mixture, or less than about 13 cal/g of the mixture. For example, the amount of the free radical precursor in the mixture can be about 3 wt % and prior to heating the mixture to a temperature of at least 60° C., the amount of energy generated from the mixture due to exothermic reaction(s) can be less than about 21 cal/g of the mixture, less than about 20 cal/g of the mixture, less than about 18 cal/g of the mixture, less than about 16 cal/g of the mixture, less than about 14 cal/g of the mixture, less than about 12 cal/g of the mixture, less than about 10 cal/g of the mixture, less than about 8 cal/g of the mixture, less than about 6 cal/g of the mixture, or less than about 4 cal/g of the mixture. In another example, the amount of the free radical precursor in the mixture can be about 4 wt % and prior to heating the mixture to a temperature of at least 60° C., the amount of energy generated from the mixture due to exothermic reaction(s) can be less than about 28 cal/g of the mixture, less than about 26 cal/g of the mixture, less than about 24 cal/g of the mixture, less than about 22 cal/g of the mixture, less than about 20 cal/g of the mixture, less than about 18 cal/g of the mixture, less than about 16 cal/g of the mixture, less than about 14 cal/g of the mixture, less than about 12 cal/g of the mixture, or less than about 10 cal/g of the mixture. In another example, the amount of the free radical precursor in the mixture can be about 5 wt % and prior to heating the mixture to a temperature of at least 60° C., the amount of energy generated from the mixture due to exothermic reaction(s) can be less than about 35 cal/g of the mixture, less than about 33 cal/g of the mixture, less than about 31 cal/g of the mixture, less than about 29 cal/g of the mixture, less than about 27 cal/g of the mixture, less than about 25 cal/g of the mixture, less than about 23 cal/g of the mixture, less than about 21 cal/g of the mixture, less than about 19 cal/g of the mixture, or less than about 17 cal/g of the mixture. In another example, the amount of the free radical precursor in the mixture can be about 6 wt % and prior to heating the mixture to a temperature of at least 60° C., the amount of energy generated from the mixture due to exothermic reaction(s) can be less than about 42 cal/g of the mixture, less than about 40 cal/g of the mixture, less than about 38 cal/g of the mixture, less than about 36 cal/g of the mixture, less than about 34 cal/g of the mixture, less than about 32 cal/g of the mixture, less than about 30 cal/g of the mixture, less than about 28 cal/g of the mixture, less than about 26 cal/g of the mixture, or less than about 24 cal/g of the mixture. In another example, the amount of the free radical precursor in the mixture can be about 7 wt % and prior to heating the mixture to a temperature of at least 60° C., the amount of energy generated from the mixture due to exothermic reaction(s) can be less than about 49 cal/g of the mixture, less than about 45 cal/g of the mixture, less than about 40 cal/g of the mixture, less than about 35 cal/g of the mixture, less than about 30 cal/g of the mixture, less than about 25 cal/g of the mixture, less than about 20 cal/g of the mixture, less than about 15 cal/g of the mixture, less than about 10 cal/g of the mixture, or less than about 8 cal/g of the mixture.

Illustrative free radical precursors can include, but are not limited to, one or more azo compounds, one or more oxidants, a combination or mixture of one or more catalysts and one or more oxidants, or any mixture or combination thereof. Illustrative azo compounds can be represented by the general formula R—N=N—R', where R and R' can independently be substituted aryl or substituted alkyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, isobutyl, n-butyl, sec butyl, t-butyl, n-pentyl, n-hexyl, and ethylhexyl. Suitable azo compounds can include, but are not limited to, azobisisobutyronitrile (AIBN).

The catalyst, if present in the free radical precursor, can also be referred to as an initiator, a promoter, a reducer, and/or an accelerator. Suitable catalysts can be or include, but are not limited to, metal ions, tertiary amines, polymeric tertiary amines, polyamines, phosphates, bisulfites, metabisulfites, tetraacetylethylenediamine, cyanamides, ultraviolet light, any combination thereof, or any mixture thereof. Any catalyst or combination of catalysts can be combined with the lignocellulose substrates and the oxidant to produce the mixture. In addition to or in lieu of contacting the lignocellulose substrates with an oxidant and/or catalyst, ultrasonic waves, photo-Fenton and/or electro-Fenton reactions (in situ generation of hydroxyl radicals by radiation or electric currents) can be used.

Suitable metal can include one or more Group 3 to Group 12 metal atoms. As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC) unless otherwise noted. Illustrative transition metals can include, but are not limited to, metal ions of iron, copper, manganese, tungsten, molybdenum, cobalt, titanium, or any combination or mixture thereof. The metal can be in the form of an oxide. The metal can be in the form of a salt or complex. For example, the metal can be bound to one or more complexing agents or compounds. Illustrative complexing agents or complexing compounds can include, but are not limited to, cyanide ($CN^-$), sulfate ($SO_4^{2-}$), ethylenediaminetetraacetic acid (EDTA), ethylenediamine-N,N'-disuccinic acid (EDDS), ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any combination or mixture thereof. Other complexing compounds can include phosphates, or complexing agents based on phosphonic acid, oxalic acid, ascorbic acid, nitrilotriacetate, gallic acid, fulvic acid, or polyoxometalates.

In one or more embodiments, the catalyst can include $Fe^{2+}$ or $Fe^{3+}$ ions such as iron(II) sulfate, iron(II) oxide, iron(III) sulfate, iron(III) oxide. Other iron ion containing catalysts can include, but are not limited to, $[Fe(CN)_6]^{3-}$, ferrocyanide $[Fe(CN)_6]^{4-}$, and/or $[Fe(CN)_5NO]^{2-}$. For example, the catalyst can be or include, but is not limited to, potassium ferricyanide ($K_3[Fe(CN)_6]$), potassium ferrocyanide ($K_4[Fe(CN)_6]$), ammonium hexacyanoferrate(II) hydrate (($NH_4)_4[Fe(CN)_6] \cdot xH_2O$), ammonium iron(III) hexacyanoferrate(II) hydrate, sodium ferrocyanide decahydrate ($Na_4[Fe(CN)_6] \cdot 10H_2O$), sodium nitroprusside dihydrate ($Na_2[Fe(CN)_5NO] \cdot 2H_2O$). Other suitable catalyst that contain iron can include, but are not limited to, Fe[EDTA], Fe[EDDS], Fe[DTPA], Fe[EGTA], Fe[CDTA], Fe[IDS], or any mixture thereof. In at least one specific embodiment, the catalyst preferably includes ferricyanide, e.g., potassium ferricyanide, a complex of iron and ethylenediaminetetraacetic acid (EDTA), a complex of iron and (S,S)-ethylenediamine-N,N'-disuccinic acid ((S,S)-EDDS), a complex of iron and (R,R)-ethylenediamine-N,N'-disuccinic acid ((R,R)-EDDS), a complex of iron and (R,S)-ethylenediamine-N,N'-disuccinic acid ((R,S)-EDDS), a complex of iron and diethylenetriaminepentaacetic acid (DTPA), a complex of iron and trans-1,2-diaminocyclohexane tetraacetic acid (DCTA), a complex of iron and iminodisuccinate (IDS), or any mixture thereof.

Tertiary amines can be represented by the general formula $NR_1R_2R_3$, where each $R_1$, $R_2$, and $R_3$ is independently selected from alkyls, cycloalkyls, heterocycloalkyls, aryls, heteroaryls, and substituted aryls. The alkyl can include branched or unbranched alkyls having from 1 to about 15 carbon atoms or more preferably from 1 to about 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. The aryl substituents can include from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative tertiary amines can include, but are not limited to, trimethylamine, triethylamine, triethanolamine, any combination thereof, or any mixture thereof. Illustrative polymeric tertiary amines can include, but are not limited to, poly(N-methyl-diallyl amine), poly(N-dimethyl-vinyl amine), copolymers of N-dimethyl-vinyl amine, any combination thereof, or any mixture thereof. Illustrative polyamines can include, but are not limited to, diethylenetriamine ("DETA"), triethylenetetramine ("TETA"), tetraethylenepentamine ("TEPA"). Other polyamines can include, for example, 1,3-propanediamine, 1,4-butanediamine, polyamidoamines, and polyethylenimines.

Illustrative phosphates can be or include, but are not limited to, potassium, phosphate, sodium phosphate, ammonium phosphate, or any combination or mixture thereof. Illustrative bisulfites can include, but are not limited to, sodium bisulfite. Illustrative metabisulfites can be or include, but are not limited to, sodium metabisulfite, potassium metabisulfite, or any combination or mixture thereof. Illustrative cyanamides can include, but are not limited to, cyanamide, calcium cyanamide, sodium hydrogen cyanamide, any combination thereof, or any mixture thereof.

The amount of catalyst, if present in the free radical precursor, can widely vary. For example, the amount of catalyst in the mixture can be from a low of about 0.00001 wt %, about 0.0001 wt %, about 0.001 wt %, about 0.01 wt %, or about 0.1 wt % to about 0.5 wt %, about 1 wt %, about 3 wt %, about 5 wt %, about 10 wt %, or about 20 wt %, based on the dry weight of the lignocellulose substrates, with suitable ranges including the combination of any two values. In another example, the amount of catalyst in the mixture can be from about 0.01 wt % to about 1.5 wt %, about 0.1 wt % to about 1.3 wt %, about 0.05 wt % to about 0.5 wt %, about 0.07 wt % to about 0.4 wt %, about 0.05 wt % to about 5 wt %, based on the dry weight of the lignocellulose substrates. In another example, the amount of the catalyst in the mixture can be about 0.001 wt % to about 0.5 wt %, about 0.15 wt % to about 0.35 wt %, about 0.1 wt % to about 0.4 wt %, about 0.1 wt % to about 2 wt %, about 0.05 wt % to about 3 wt %, about 0.05 wt % to about 0.35 wt %, about 0.1 wt % to about 4.5 wt %, about 0.15 wt % to about 4 wt %, about 0.05 wt % to about 3 wt %, or about 0.01 wt % to about 3.5 wt %, based on the dry weight of the lignocellulose substrates.

In one or more embodiments, the amount of the metal, if present in the catalyst, that can remain bound to the complexing agent until the mixture is heated, e.g., to a temperature of about 60° C. to about 300° C., can be at least at least 11%, at least 13%, at least 15%, at least 20%, at least 25%, at least 30%, at least 35%, at least 40%, at least 45%, at least 50%, at least 55%, at least 60%, at least 65%, or at least 70% of the amount of metal that was initially present in the mixture and bound to the complexing agent. In another example, the amount of the metal, if present in the catalyst, that can remain bound to the complexing agent until the mixture is heated, e.g., to a temperature of about 60° C. to about 300° C., can be about 11% to about 95%, about 15% to about 85%, about 20% to about 90%, about 30% to about 80%, about 11% to about 100%, about 35% to about 75%, about 40% to about 70%, or about 30% to about 95% of the amount of the metal initially present in the mixture and bound to the complexing agent.

The catalyst, if combined with a liquid medium, can have a total concentration of solids ranging from about 0.001 wt % to about 99.9 wt %. Preferably, if the catalyst is combined with a liquid medium, the catalyst and liquid medium mixture can have a concentration of solids from a low of about 0.1 wt %, about 0.5 wt %, about 1 wt %, or about 2 wt % to a high of about 4 wt %, about 5 wt %, about 6 wt %, about 7 wt %, or about 8 wt %, based on the combined weight of the catalyst and the liquid medium, with suitable ranges including the combination of any two values.

The oxidant, if present in the free radical precursor, can be or include any suitable oxidant or combination of oxidants. The oxidant can be a solid, liquid, gas, or multi-phase. Illustrative oxidants can include, but are not limited to, inorganic and/or organic peroxy compounds, ozonides, halogen containing oxidants, any combination thereof, or any mixture thereof. Illustrative inorganic peroxy compounds can include, but are not limited to, hydrogen peroxide, hydrogen peroxide generating compounds, e.g., alkali metal salts of percarbonate, perborate, peroxysulfate, peroxyphosphate, and/or peroxysilicate, and/or corresponding weak acids. Illustrative organic peroxy compounds can include, but are not limited to, t-butyl peroxide, benzoyl peroxide, peroxy carboxylic acids, peracetic acid, perbenzoic acid, hydroperoxides, e.g., t-butyl hydroperoxides, or any combination or mixture thereof. Illustrative halogen containing oxidants can include, but are not limited to, alkali metal chlorite, alkali metal hypochlorite, chlorine dioxide, and/or a chloro sodium salt of cyanuric acid. An illustrative ozonide can include, but is not limited to, dimethyloxirane.

The oxidant can be combined with one or more liquid mediums. For example, the oxidant can be or include an aqueous solution of hydrogen peroxide. The concentration of oxidant, e.g., hydrogen peroxide, combined with a liquid medium, e.g., water, can be from a low of about 1 wt %, about 3 wt %, about 5 wt %, about 10 wt %, about 15 wt %, about 20 wt %, about 25 wt %, or about 30 wt % to a high of about 50 wt %, about 60 wt %, about 70 wt %, about 80 wt %, about 90 wt %, or about 98 wt %, based on the combined weight of the oxidant and the liquid medium, with suitable ranges including the combination of any two values.

The amount of oxidant present in the mixture can depend, at least in part, on the particular oxidant, catalyst, lignocellulose substrates, and/or, if present, the compound having at least two hydrogen atoms that are abstractable in the presence of hydroxyl radicals and, thus, can widely vary. For example, the amount of oxidant in the mixture can be from about 1 wt % to about 200 wt %, based on the dry weight of the lignocellulose substrates. In another example, the amount of oxidant in the mixture can be from a low of about 1 wt %, about 5 wt %, about 10 wt %, or about 20 wt % to a high of about 80 wt %, about 100 wt %, about 120 wt %, or about 150 wt %, based on the dry weight of the lignocellulose substrates, with suitable ranges including the combination of any two values. In another example, the oxidant can be present in the mixture in an amount from about 0.1 wt % to about 30 wt %, about 1 wt % to about 20 wt %, about 5 wt % to about 50 wt %, about 10 wt % to about 70 wt %, about 0.5 wt % to about 25 wt %, about 3 wt % to about 6 wt %, or about 2 wt % to about 8 wt %, based on the dry weight of the lignocellulose substrates. In still another example, the oxidant can be present in the mixture in amount of about 0.1 wt % to about 10 wt %, about 1 wt % to about 12 wt %, about 2 wt % to about 9 wt %, about 3 wt % to about 9 wt %, about 5 wt % to about 15 wt %, about 4 wt % to about 6 wt %, about 8 wt % to about 20 wt %, or about 2 wt % to about 10 wt %, based on the dry weight of the lignocellulose substrates.

In one or more embodiments, the amount of oxidant, if present as or in the free radical precursor, that can remain present until the mixture is heated, e.g., to a temperature of at least 60° C. to about 300° C., can be at least at least 11%, at least 13%, at least 15%, at least 20%, at least 25%, at least 30%, at least 35%, at least 40%, at least 45%, at least 50%, at least 55%, at least 60%, at least 65%, or at least 70% of the amount of oxidant initially present in the mixture. In another example, the amount of the oxidant, if present in the free radical precursor, that can remain present until the mixture is heated, e.g., to a temperature of about 60° C. to about 300° C., can be about 11% to about 95%, about 15% to about 85%, about 20% to about 90%, about 30% to about 80%, about 11% to about 100%, about 35% to about 75%, about 40% to about 70%, or about 30% to about 95% of the amount of the oxidant initially present in the mixture.

The optional one or more compounds having at least two hydrogen atoms that are abstractable in the presence of hydroxyl radicals can be or include, but are not limited to, one or more lignins, one or more tannins, one or more novolac resins, one or more modified phenol formaldehyde resins, bis-phenol A, humic acids, or any combination or mixture thereof. If two or more compounds having at least two hydrogen atoms that are abstractable in the presence of hydroxyl radicals are present, the two or more compounds having at least two hydrogen atoms that are abstractable in the presence of hydroxyl radicals can be present in any amount with respect to one another. The one or more compounds having at least two hydrogen atoms that are abstractable in the presence of hydroxyl radicals can be in the form of a solid, a liquid, or a "two phase" or solid/liquid mixture.

Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, or any combination thereof. For example, the plant matter can be or include wood, for example hardwoods, softwoods, or a combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The lignin can be extracted, separated, or otherwise recovered from the wood, plant, and/or vegetable matter using any of a number of well established processes. For example, in the pulp and paper industry, lignin-containing materials such as wood, straw, corn stalks, bagasse, and other vegetable and plant tissues can be processed to recover the cellulose or pulp via the well known kraft or sulfate process or the well known sulfite process. The residual pulping liquors that include the lignin as a by-product can be a source of lignin. The chemical structure of lignin can vary and the variation can depend, at least in part, on the particular plant from which the lignin is recovered from, location the plant was grown, and/or on the particular method used in recovery or isolation of the lignin from the plant and/or vegetable matter. Lignin can include active groups, such as active hydrogens and/or phenolic hydroxyl groups through which crosslinking or bridging can be effected.

One process for recovering lignin can be or include the process commonly referred to as the organosolv process. The organosolve process uses an organic solvent to solubilize lignin and hemicelluloses. The organosolve process can include contacting lignocellulose material, e.g., wood chips or particles, with an aqueous organic solvent at a temperature from a low of about 130° C., about 140° C., or about 150° C. to a high of about 200° C., about 220° C., or about 230° C. The lignin can break down by hydrolytic cleavage of alpha aryl-ether links into fragments that can be solubilized in the solvent system. Illustrative solvents can include, but are not limited to, acetone, methanol, ethanol, butanol, ethylene glycol, formic acid, acetic acid, any combination thereof, or any mixture thereof. The aqueous organic solvent can have a concentration of the solvent in water from a low of about 30 wt %, about 40 wt % or about 50 wt % to a high of about 70 wt %, about 80 wt %, or about 90 wt %.

Since the lignin separated from the plant can be chemically altered from that found in the plant, the term "lignin," can also refer to lignin products obtained upon separation from the cellulose or recovered from the plant matter. For example, in a sulfite pulping process, the lignocellulose material can be digested with a bisulfite or sulfite resulting in the at least partial sulfonation of the lignin. As such, the lignin can optionally be subjected to further cleavage and/or other modifications such as alkaline treatment or reaction with other constituents to decrease the sulfonate or sulfur content and/or increase the active groups. For example, the lignin can be processed such that it has a phenolic hydroxyl content from about 1.5 wt % to about 5 wt % and less than about 3 wt % sulfonate sulfur. In other methods of recovery or separation of lignin from wood, plant, or vegetable material, the lignin may not be sulfonated, but could be chemically altered somewhat in some other manner. For example, in residual pulping liquors obtained in sulfate or other alkaline pulping processes, the lignin can be present as an alkali metal salt dissolved in the alkaline, aqueous liquor and can generally include a sufficient phenolic hydroxyl content to require no further modification. However, the alkali or kraft lignin can be further reacted with other constituents to further increase the active groups. "Hydrolysis lignin" that can be recovered from the hydrolysis of lignocellulose materials in the manufacture of sugar, for example, can also be altered somewhat from that found in the plant. As such hydrolysis lignin can be further modified to solubilize the lignin as well as to increase the phenolic hydroxyl content. Also, the lignin products such as residual pulping liquor may be subjected to various treatments such as, for example, acid, alkaline or heat treatments or reacted with the other chemicals which may further alter somewhat the lignin constituents.

The residual pulping liquors or the lignin products produced in the separation or recovery of lignin from the plant matter can include lignin of various weight average molecular weights (Mw) ranging from about 300 to over 100,000. For example, the lignin can have a Mw from a low of about 500, about 1,000, about 5,000, about 10,000, about 15,000, or about 20,000 to a high of about 30,000, about 45,000, about 55,000, about 70,000, about 80,000, about 85,000, about 90,000, or about 95,000, with suitable ranges including the combination of any two values. In another example, the lignin can have a Mw from a low of about 300, about 500, about 800, about 900, about 1,000, or about 1,100 to a high of about 1,300, about 1,500, about 1,900, about 2,300, about 2,500, about 2,700, about 3,000, about 3,300, about 3,500, about 3,700, about 4,000, about 4,300, about 4,500, about 4,700, or about 5,000, with suitable ranges including the combination of any two values. In another example, the lignin can have a Mw from a about 500 to about 30,000, about 1,000 to about 15,000, about 800 to about 6,000, about 2,000 to about 12,000, about 400 to about 10,000, or about 600 to about 8,000. In another example, the Mw of the lignin can be from about 600 to about 4,500, about 350 to about 1,100, about 750 to about 2,500, about 950 to about 3,100, about 1,500 to about 3,400, or about 1,800 to about 4,200.

The liquors from which the lignin can be recovered can also include one or more other constituents in addition to the lignin. For example, in the sulfite pulping process, the spent sulfite liquor can include lignosulfonates that can be present as salts of cations, such as magnesium, calcium, ammonium, sodium and/or other cations. The spent sulfite liquor solids can include about 40 wt % to about 65 wt % lignosulfonates with the remainder being carbohydrates and other organic and inorganic constituents dissolved in the liquor. Lignin products produced by other pulping processes can also include other materials such as carbohydrates, degradation products of carbohydrates, and resinous materials which are separated from the cellulosic materials with the lignin. It should be noted that it is not necessary to separate the lignin from the other constituents that can be present.

Suitable lignin material can include, but is not limited to, lignin in its native or natural state, i.e., non-modified or unaltered lignin, lignosulfonates, or any combination or mixture thereof. Suitable lignosulfonates can include, but are not limited to, ammonium lignosulfonate, sodium lignosulfonate, calcium lignosulfonate, magnesium lignosulfonate, or any combination or mixture thereof.

Suitable processes for isolating or otherwise separating lignin or lignin containing products form wood, plant, vegetable, or other lignin containing matter can include those discussed and described in U.S. Pat. Nos. 1,856,567; 2,525,433; 2,680,113; 2,690,973; 3,094,515; 3,158,520; 3,503,762; 3,585,104; 3,726,850; 3,769,272; 3,841,887; 4,100,016; 4,131,564; 4,184,845; 4,308,203; 4,355,996; 4,470,876; 4,740,591; and 4,764,596; U.S. Patent Application Publication Nos.: 2011/0294991; and WO Publication Nos. WO1992/018557A1, WO1993/021260A2; WO1994/024192A1; WO2005/062800A2; WO2006/031 175 A1; and WO2011/150508. Commercially available lignin can include, but is not limited to, lignosulfonates available from Tembec (Canada).

The novolac resin can be produced by reacting a phenol component with an aldehyde component or aldehyde compound(s) in the presence of an acid catalyst. The phenol component of the novolac resin can include a variety of substituted phenolic compounds, unsubstituted phenolic compounds, or any combination of substituted and/or unsubstituted phenolic compounds. For example, the phenol component can be phenol itself, i.e., mono-hydroxy benzene. Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bis-phenol A and bis-phenol F also can also be used. Specific examples of suitable phenolic compounds (phenol components) for replacing a portion or all of the phenol used in preparing a novolac resin can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol component includes phenol (mono-hydroxy benzene).

Illustrative aldehyde compounds can include the so-called masked aldehydes or aldehyde equivalents, such as acetals or hemiacetals. Suitable aldehydes can be represented by the general formula R'CHO, where R' is a hydrogen or a hydrocarbon radical generally having 1-8 carbon atoms. Specific examples of suitable aldehyde compounds can include, but are not limited to, formaldehyde, acetaldehyde, propionaldehyde, butyraldehyde, furfuraldehyde, benzaldehyde, any combination thereof, or any mixture thereof. As used herein, the term "formaldehyde" can refer to formaldehyde, formaldehyde derivatives, other aldehydes, or combinations thereof. Preferably, the aldehyde component is formaldehyde. One or more difunctional aldehydes can also be used to produce the novolac resin, and could advantageously be used to introduce cross-links ultimately into the at least partially cured novolac resin.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

A molar ratio of formaldehyde to phenol used to produce the novolac resin can be from about 0.5 to about 0.95 or more preferably from about 0.7 to about 0.85. The reaction between the phenol and the formaldehyde to produce the novolac resin can be carried out in the presence of an acid catalyst under acidic conditions. Suitable acid catalysts can include, but are not limited to, oxalic acid, sulfuric acid, p-toluene sulfuric acid, hydrochloric acid, salicylic acid, mineral acids and salts thereof, any combination thereof, or any mixture thereof. Mixed catalyst systems, such as ZnOAc/oxalic acid and other divalent metal compounds, e.g., acetates, can be used to prepare "high-ortho" novolac resins. Divalent metal compounds can include Ca, Mg, Zn, Cd, Pb, Cu, CO, and Ni. Preferred catalysts include oxalic acid, sulfuric acid, p-toluene sulfonic acid, and ZnOAc/oxalic acid. Most preferably, the catalyst is oxalic acid or ZnOAc/oxalic acid.

The amount of acid catalyst used to produce the novolac resin can be sufficient to catalyze the reaction between the phenol and formaldehyde to produce the novolac resin. The phenol/formaldehyde reaction can be conducted in about 1 to about 6 hours, e.g., in about 2 to about 4 hours. The phenol/formaldehyde reaction can be carried out at a temperature from about 80° C. to about 100° C., e.g., about 95° C. to about 100° C. The reaction can be carried out at atmospheric pressure, although increased pressure can be utilized to permit the application of higher temperatures and, therefore, faster reaction rates and accordingly shorter reaction times.

The novolac resin can be treated to remove water and/or other volatile organic materials by heating, such as by distillation. After this treatment, the free phenol can be about 0.001% to about 2.0%, preferably about 0.001% to about 0.5%. Distillation of the resulting novolac resin can be performed at atmospheric pressure by heating up to about 140° C., and then under a vacuum until the resin reaches a temperature of about 180° C. to about 220° C. Other suitable methods for treating the resin via heat can include thin-film evaporators. The resulting molten novolac resin can be cooled to a temperature below about 100° C.

If desired, the novolac resin can be neutralized. Neutralization of the novolac resin can be accomplished by the addition of one or more bases or base compounds, such as sodium hydroxide and/or potassium hydroxide, or its equivalent. The base compound can be added in an amount sufficient to raise the pH of the novolac resin to between about 5 to about 9, e.g., about 6 to about 8. Typically, about 10 wt % to about 30 wt % of water, based on the total resin solids, can be added. Suitable novolac resins and inverted novolac resins can be as discussed and described in U.S. Pat. No. 5,670,571 and U.S. Patent Application Publication No. 2008/0280787.

As used herein, the term "tannin" refers to both hydrolyzable tannins and condensed tannins. As such, the compound having at least two hydrogen atoms that are abstractable in the presence of hydroxyl radicals can be or include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya*, and *Pinus*, any combination thereof, or any mixture thereof. In another example, genera from which suitable tannins can be derived can include, but are not limited to, *Schinopsis, Acacia*, or a combination thereof. In another example, genera from which suitable tannins can be derived can include, but are not limited to, *Pinus, Carya*, or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllantus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., Radiata pine, Maritime pine, bark extract species).

The condensed tannins typically include about 70 wt % to about 80 wt % active phenolic ingredients (the "tannin fraction") and the remaining ingredients (the "non-tannin fraction") typically include, but are not limited to, carbohydrates, hydrocolloid gums, and amino and/or imino acid fractions. The condensed tannins can be used as recovered or extracted from the organic matter or the condensed tannins can be purified, e.g., about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. The resorcinol unit can be represented by formula I below.

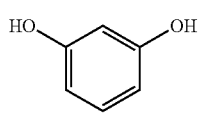

formula I

The resorcinol group is shown within the box overlaying the unit structure of black wattle and quebracho tannins in formula II below. For simplicity, the structure of black wattle and quebracho tannins is represented by their flavonoid unit structure.

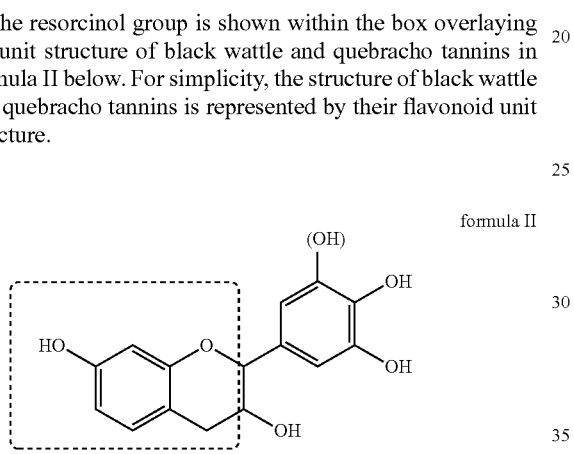

formula II

Illustrative tannins that include the phloroglucinol unit include, but are not limited to, pecan tannins and pine tannins. The phloroglucinol unit can be represented by formula III below.

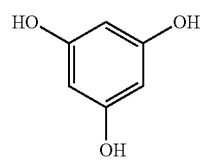

formula III

The phloroglucinol unit is shown within the box overlaying the unit structure of pecan and pine tannins in formula IV below. For simplicity, the structure of pecan and pine tannins is represented by their flavonoid unit structure.

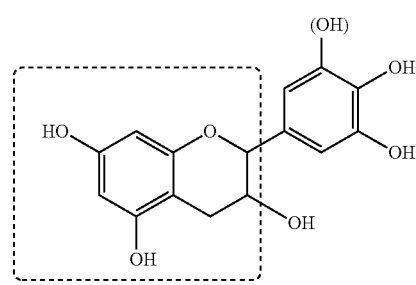

formula IV

Phloroglucinol is known for higher reactivity than resorcinol. As such, tannins that include the phloroglucinol unit are more reactive than tannins that include the resorcinol unit.

The tannins can have an acidic pH. For example, the pH of the tannins can be from a low of about 3, about 3.5, or about 4 to a high of about 5, about 5.5, about 6, or about 6.5, with suitable ranges including the combination of any two values. The tannins can have resorcinol and/or phloroglucinol functional groups. Suitable, commercially available tannins can include, but are not limited to, black wattle tannin, quebracho tannin, hemlock tannin, sumach tannins, pecan tannin, mimosa tannin, pine tannins, any combination thereof, or any mixture thereof.

Illustrative modified phenol formaldehyde resins can include ARYLZENE®, which can be represented by the general formula IX:

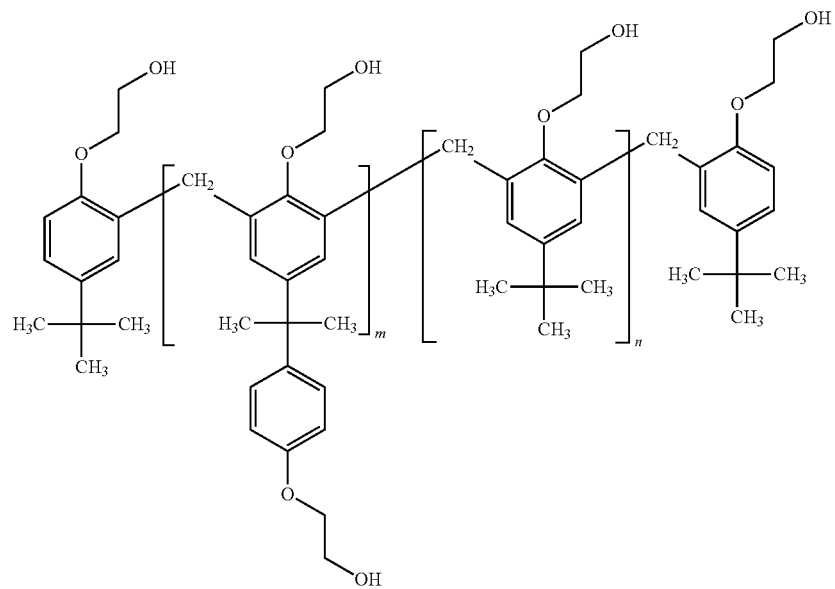

where n = 3 and 0.8 < m < 1.5

Other illustrative modified phenol formaldehyde resins can be or include those discussed and described in U.S. Pat. Nos. 5,674,970; 5,739,259; 5,756,642; 5,756,655; 5,770,750; 5,773,552; 5,837,798; 5,889,137; 6,166,151; 6,291,077; 6,399,740; and 6,569,953.

Humic acid can be represented by the general formula X:

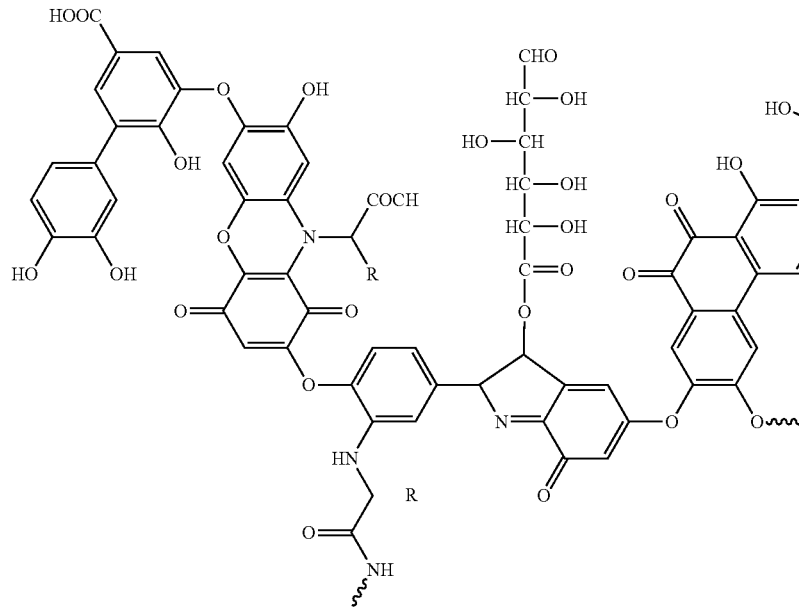

The compound having at least two hydrogen atoms that are abstractable in the presence of hydroxyl radicals, e.g., the tannin, lignin, and/or novolac resin, can be combined with a liquid medium. The compound having at least two hydrogen atoms that are abstractable in the presence of hydroxyl radicals when combined with a liquid medium can have a total concentration of solids ranging from about 1 wt % to about 99 wt %. For example, the compound having at least two hydrogen atoms that are abstractable in the presence of hydroxyl radicals combined with a liquid medium can have a concentration of solids from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the compound having at least two hydrogen atoms that are abstractable in the presence of hydroxyl radicals and the liquid medium. In another example, the compound having at least two hydrogen atoms that are abstractable in the presence of hydroxyl radicals combined with a liquid medium can have a concentration of solids from about 40% to about 60%, about 45% to about 55%, or about 47% to about 50%. In another example, the compound having at least two hydrogen atoms that are abstractable in the presence of hydroxyl radicals combined with a liquid medium can have a concentration of solids from about 10% to about 30%, about 15% to about 35%, about 20% to about 40%, about 25% to about 45%, about 20% to about 50%, or about 35% to about 55%.

As used herein, the solids concentration or solids content of the compound having at least two hydrogen atoms that are abstractable in the presence of hydroxyl radicals, e.g., lignin, tannin, and/or novolac resin, as understood by those skilled in the art, can be measured by determining the weight loss upon heating a small sample, e.g., 1-5 grams of the compound having at least two hydrogen atoms that are abstractable in the presence of hydroxyl radicals, to a suitable temperature, e.g., 125° C., and a time sufficient to remove any liquid combined therewith. By measuring the weight of the sample before and after heating, the percent solids in the sample can be directly calculated or otherwise estimated.

Any one or more of the compounds having at least two hydrogen atoms that are abstractable in the presence of hydroxyl radicals can be modified with one or more compounds having one or more carbon-carbon double bonds and one or more reactive functional groups. For example, the mixture can include one or more modified compounds having at least two hydrogen atoms that are abstractable in the presence of hydroxyl radicals produced by at least partially reacting one or more unsaturated monomers having one or more reactive functional groups with the one or more compounds having at least two hydrogen atoms that are abstractable in the presence of hydroxyl radicals, e.g., the lignin, tannin, novolac resin, modified phenol formaldehyde resin, bis-phenol A, and/or humic acid. Any suitable compounds having one or more carbon-carbon double bonds and one or more reactive functional groups or combination of compounds having one or more carbon-carbon double bonds and one or more reactive functional groups can be used to produce the modified compound having at least two hydrogen atoms that are abstractable in the presence of hydroxyl radicals. Preferably the compounds having one or more carbon-carbon double bonds and one or more reactive functional groups are nonionic. Illustrative compounds having one or more carbon-carbon double bonds and one or more reactive functional groups can include, but are not limited to, one or more unsaturated glycidyl ethers, one or more unsaturated glycidyl esters, one or more unsaturated mono-epoxides, one or more unsaturated methylol compounds, maleic anhydride, any combination thereof, or any mixture thereof.

Illustrative unsaturated glycidyl ethers can be represented by general formula V:

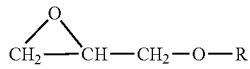

formula V where R can be an ethylenically unsaturated radical such as vinyl, allyl, alkenyl, and the like. Suitable glycidyl ethers can include, but are not limited to, vinyl glycidyl ether, isopropenyl glycidyl ether, oleyl glycidyl ether, allyl glycidyl ether, p-vinylbenzyl glycidyl ether, o-allyl phenyl glycidyl ether, butenyl glycidyl ether, 4-vinylcyclohexyl glycidyl ether, abietylglycidyl ether, cyclohexeneylmethyl glycidyl ether, methallyl glycidyl ether, any combination thereof, or any mixture thereof.

Illustrative unsaturated glycidyl esters can be represented by general formula VI:

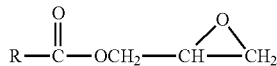

formula VI where R can be an unsaturated, unsubstituted alkyl radical having from two to 19 carbon atoms. Suitable glycidyl esters can include, but are not limited to, glycidyl methacrylate, glycidyl acrylate, glycidyl crotonate, glycidyl oleate, di-glycidyl maleate, di-glycidyl fumarate, any combination thereof, or any mixture thereof.

Illustrative unsaturated mono-epoxides can include, but are not limited to, linear or cycloaliphatic epoxy compounds, where the unsaturation is terminal. Suitable unsaturated mono-epoxides can be represented by general formula VII:

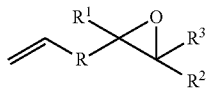

formula VII where R can be a single bond or an alkylene optionally containing alkyl pendant groups; $R^1$, $R^2$, and $R^3$ can independently be hydrogen, alkyl straight, branched or cyclic, or any two of $R^1$, $R^2$, or $R^3$ can be alkylene and combined to form a 5 to 12 carbon cyclic ring, optionally containing alkyl pendants; and the number of carbon atoms in R, $R^1$, $R^2$, and $R^3$ can be such that the total number of carbon atoms in the epoxide is from 4 to 50. Suitable unsaturated mono-epoxides can include, but are not limited to, 4-vinyl cyclohexene oxide, 1-methyl-4-isopropenyl cyclohexene monoxide, butadiene monoxide, any combination thereof, or any mixture thereof.

Illustrative unsaturated methylol compounds can be represented by the general formula VIII:

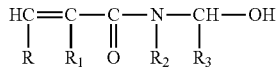

formula VIII where R, $R_1$, $R_2$, and $R_3$ can independently be hydrogen or a hydrocarbyl group, e.g., an alkyl group, containing from about 1 to about 6 carbon atoms. For example, an alkyl group can include from 1 to 4 carbon atoms. In at least one example, R, $R_1$, $R_2$, and $R_3$ can each independently be methyl or hydrogen. Suitable unsaturated methylol compounds can include, but are not limited to, N-methylol acrylamide, N-methylol methacrylamide, N-methylol crotonamide, any combination thereof, or any mixture thereof. The N-methylol ethylenically unsaturated amide can be in the form of an aqueous solution.

In at least one example, the modified compound having at least two hydrogen atoms that are abstractable in the presence of hydroxyl radicals can be free or essentially free of any anionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % anionic monomers. In at least one example, the modified compound having at least two hydrogen atoms that are abstractable in the presence of hydroxyl radicals can be free or essentially free of any ionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % ionic monomers. In at least one other example the modified compound having at least two hydrogen atoms that are abstractable in the presence of hydroxyl radicals can be free or essentially free of any anionic and ionic monomers. For example, the modified compound having at least two hydrogen atoms that are abstractable in the presence of hydroxyl radicals can contain less than about 3 wt %, less than about 2.5 wt %, less than about 2 wt %, less than about 1.5 wt %, less than about 1 wt %, less than about 0.7 wt %, less than about 0.5 wt %, less than about 0.3 wt %, less than about 0.1 wt %, less than about 0.05 wt %, or less than about 0.01 wt % anionic and ionic monomers. As used herein, the terms "essentially free of anionic monomers" and "essentially free of ionic monomers" means the modified compound having at least two hydrogen atoms that are abstractable in the presence of hydroxyl radicals does not include any intentionally added anionic monomers or ionic monomers, respectively. Said another way, the terms "essentially free of anionic monomers" and "essentially free of ionic monomers" means the modified compound having at least two hydrogen atoms that are abstractable in the presence of hydroxyl radicals may include anionic monomers and/or ionic monomers present as an impurity.

The amount of the compound having at least two hydrogen atoms that are abstractable in the presence of hydroxyl radicals, if present in mixture, can widely vary. For example, the amount of the compound having at least two hydrogen atoms that are abstractable in the presence of hydroxyl radicals in the mixture can be from about 0.01 wt % to about 50 wt %, based on the dry weight of the lignocellulose substrates. In another example, the amount of the compound having at least two hydrogen atoms that are abstractable in the presence of hydroxyl radicals in the mixture can be from a low of about 0.05 wt %, about 0.1 wt %, about 0.5 wt %, about 1 wt %, about 2 wt %, about 3 wt %, about 5 wt %, or about 7 wt % to a high of about 15 wt %, about 20 wt %, about 25 wt %, or about 30 wt %, based on the dry weight of the lignocellulose substrates, with suitable ranges including the combination of any two values. In another example, the amount of the compound having at least two hydrogen atoms that are abstractable in the presence of hydroxyl radicals in the mixture can be from a low of about 0.1 wt %, about 0.5 wt %, about 1 wt %, about 3 wt %, or about 5 wt % to a high of about 10 wt %, about 13 wt %, about 15 wt %, about 17 wt %, or about 20 wt %, based on the dry weight of the lignocellulose substrates, with suitable ranges including the combination of any two values. In another example, the amount of the compound having at least two hydrogen atoms that are abstractable in the presence of hydroxyl radicals in the mixture can be from about 1 wt % to about 15 wt %, about 5 wt % to about 15 wt %, about 8 wt % to about 13 wt %, about 7 wt % to about 12 wt %, or about 5 wt % to about 25 wt %, based on the dry weight of the lignocellulose substrates.

The lignocellulose substrates can include any one or more of the plant and vegetable materials discussed and described above with reference to the source for the lignins and tannins. As used herein, the term "lignocellulose" refers to a material that includes lignin and cellulose, hemicellulose, or a combination of cellulose and hemicelluloses. The starting material, from which the lignocellulose substrates can be or can be derived from, can be shaped, reduced, or otherwise formed to the appropriate dimensions by various processes such as hogging, grinding, hammer milling, tearing, shredding, and/or flaking. Other processes for producing the substrates can include skiving, cutting, slicing, and/or sawing. Suitable forms of the lignocellulose substrates can include, but are not limited to, chips, flakes, wafers, fibers, powder, shavings, sawdust or dust, veneer, strands, and/or the like. Accordingly, the term "substrate" when used in conjunction with "lignocellulose" refers to lignocellulose material or lignocellulose containing material having any desired shape such as chips, flakes, fibers, powder, shavings, sawdust or dust, veneer, strands, and/or the like. Other suitable lignocellulose substrates can include, but are not limited to, wood chips, wood fibers, wood flakes, wood strands, wood wafers, wood shavings, wood particles, wood veneer, any combination thereof, or any mixture thereof.

The particular configuration of the substrates can be based, at least in part, on the desired product. For example, particulates such as chips, fibers, shavings, sawdust or dust, or the like can be preferred for producing particleboards, fiberboards, and the like. The substrates can have a length from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm, with suitable ranges including the combination of any two values. In another example, veneers, i.e., layers or sheets of wood, can be used for producing plywood, laminated veneer lumber, and the like. The veneers can have a thickness from a low of about 0.8 mm, about 0.9 mm, about 1 mm, about 1.1 mm or about 1.2 mm to a high of about 3 mm, about 4 mm, about 5 mm, about 6 mm, about 7 mm, about 8 mm, about 9 mm, or about 10 mm, with suitable ranges including the combination of any two values.

The lignocellulose substrates can include liquid on, about, and/or within the substrates. For example, the lignocellulose substrates can have a liquid, e.g., moisture, content from a low of about 1 wt %, about 2 wt %, about 3 wt %, about 4 wt, or about 5 wt % to a high of about 7 wt %, about 9 wt %, about 11 wt %, about 13 wt %, about 15 wt %, about 17 wt %, about 19 wt %, about 21 wt %, about 23 wt %, about 25 wt %, about 27 wt %, about 29 wt %, about 31 wt %, about 33 wt %, about 35 wt %, or about 37 wt % based on a dry weight of the lignocellulose substrate, with suitable ranges including the combination of any two values. In another example, the lignocellulose substrates can have a liquid, e.g., moisture, content of about 1 wt % to about 10 wt %, about 2 wt % to about 4 wt %, about 2 wt % to about 3 wt %, about 3 wt % to about 6 wt %, about 5 wt % to about 10 wt %, about 6 wt % to about 8 wt %, or about 4 wt % to about 9 wt %. The lignocellulose substrates can be fresh, i.e., not treated or dried, or dried and/or treated. For example, the lignocellulose substrates and/or the starting material from which the lignocellulose substrates were derived can be at least partially dried. In another example, the lignocellulose substrates can be washed and/or leached with an aqueous medium such as water.

If any one or more of the components discussed and described herein include two or more different compounds, those two or more different compounds can be present in any ratio with respect to one another. Said another way, if the mixture includes a first and a second type of lignocellulose substrate, free radical precursor, and/or compound having at least two hydrogen atoms that are abstractable in the presence of hydroxyl radicals the amount of the first and second components can be present in any desired ratio. For example, if the oxidant is present in the free radical precursor and includes a first oxidant and a second oxidant, the mixture can have an oxidant composition that includes the first oxidant in an amount from about 1 wt % to about 99 wt % and conversely about 99 wt % to about 1 wt % of the second oxidant, based on the total weight of the oxidant composition, i.e., the total weight of the first and second oxidants. In another example, the amount of the first oxidant can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the total weight of the first and second oxidants.

One or more salts can optionally be combined with the lignocellulose substrates, the free radical precursor, and the optional compound having at least two hydrogen atoms that are abstractable in the presence of hydroxyl radicals. The amount of salt in the mixture, if present, can be from a low of about 1 wt %, about 2 wt %, or about 3 wt % to a high of about 10 wt %, about 20 wt %, or about 30 wt %, based on the dry weight of the lignocellulose substrates, with suitable ranges including the combination of any two values. The one or more salts can be combined with the lignocellulose substrates, catalyst, and/or oxidant in any order or sequence. Illustrative salts can include, but are not limited to, Al, Ca, K, Na, Cu, Zn, Mg, Mn, Ba, and/or Li cations. Suitable anions can include, but are not limited to, carbonates, chlorides, nitrates, silicates, acetates, formates, sulphates, phosphates, and/or other forms.

Illustrative composite products discussed and described herein can include, but are not limited to, particleboard, fiberboard such as medium density fiberboard ("MDF") and/or high density fiberboard ("HDF"), plywood such as hardwood plywood and/or softwood plywood, oriented strand board ("OSB"), laminated veneer lumber ("LVL"), laminated veneer boards ("LVB"), engineered wood flooring, and the like.

The method of making one or more composite products can include a continuous or semi-continuous blending process in which the lignocellulose substrates and the other components of the mixture, e.g., the catalyst, oxidant, and the compound having at least two hydrogen atoms that are abstractable in the presence of hydroxyl radicals, can be introduced to a blender at a first or introduction region, end, area, or other location(s) configured to receive the components and the mixture can be withdrawn from the blender via one or more mixture recovery outlets. The blender can be configured to contain anywhere from a few hundred kilograms to several thousand kilograms. For example, in a single blender anywhere from a low of about 500 kg/hr, about 5,000 kg/hr, about 10,000 kg/hr, or about 13,000 kg/hr to a high of about 16,000 kg/hr, about 20,000 kg/hr, about 25,000 kg/hr, or about 30,000 kg/hr of the mixture can be recovered from the blender. As the mixture exits the blender, the mixture can be deposited onto a conveyor belt and can be transported to one or more dryers, moistening systems, presses, and/or other processing equipment. For example, in at least one specific embodiment, a particle board product can be made blending a first or "face" mixture and a second or "core" mixture in a first and second blend, respectively. The first blender can produce from about 13,600 kg/hr to about 15,900 kg/hr of a "face" mixture and the second blender can produce from about 18,100 kg/hr to about 20,400 kg/hr of a "core" mixture. The "face" and "core" mixtures can be used to produce a particleboard panel or sheet, where the "face" mixture makes up the outer layers of the particleboard and the "core" mixture makes up the inner or core layer of the particleboard.

Referring to particleboard in particular, particleboard made according to one or more embodiments discussed and described herein can meet or exceed the requirements for H-1, H-2, H-3, M-0, M-1, M-S, M-2, M-3i, LD-1, and/or LD-2 grade particleboard as described in the American National Standards Institute (ANSI) for particleboard, i.e., ANSI A208.1-2009 Particleboard, approved Feb. 2, 2009. Particleboard made according to one or more embodiments discussed and described herein can meet or exceed the requirements for PBU, D-2, D-3, and/or M-3 as defined by the ANSI for particleboard, i.e., ANSI A208.1-2009 Particleboard, approved Feb. 2, 2009. For example, Tables A and B set out certain requirements for the different grades of particleboard. Referring to oriented strand board (OSB) in particular, OSB made according to one or more embodiments discussed and described herein can meet or exceed the U.S. Department of Commerce Voluntary Performance Standard PS 2. Referring to plywood in particular, plywood made according to one or more embodiments discussed and described herein can meet or exceed the U.S. Department of Commerce Voluntary Performance Standard PS 1 and/or PS-2.

In one or more embodiments, one or more additives can be combined with the lignocellulose substrates, free radical precursor, and optionally the compound having at least two hydrogen atoms that are abstractable in the presence of hydroxyl radicals to produce the mixture. Illustrative additives can include, but are not limited to, waxes and/or other hydrophobic additives, water, filler material(s), extenders, surfactants, release agents, dyes, fire retardants, formaldehyde scavengers, biocides, any combination thereof, or any mixture thereof. For composite wood products, such as plywood, typical filler material(s) can include, but are not limited to, ground pecan and/or walnut shells, and typical extenders can include, for example, wheat flour. Other suitable extenders can include, but are not limited to, polysaccharides, and the like. Illustrative polysaccharides can include, but are not limited to, starch, cellulose, gums, such as guar and xanthan, alginates, pectin, gellan, any combination thereof, or any mixture thereof. Suitable polysaccharide starches can include, for example maize or corn, waxy maize, high amylose maize, potato, tapioca, and wheat starch. Other starches such as genetically engineered starches can include high amylose potato and potato amylopectin starches.

If one or more additives is present in the mixture, the amount of each additive can range from a low of about 0.01 wt % to a high of 50 wt %, based on the total weight of the mixture. For example, the amount of any given component or additive can range from a low of about 0.01 wt %, about 0.05 wt %, about 0.1 wt %, about 0.5 wt %, or about 1 wt % to a high of about 3 wt %, about 5 wt %, about 7 wt %, or about 9 wt %, based on the total weight of the mixture. In another example, the amount of any given additive or component can range from a low of about 1 wt %, about 5 wt %, about 10 wt %, about 15 wt %, or about 20 wt % to a high of about 25 wt %, about 30 wt %, about 35 wt %, about 40 wt %, or about 45 wt %, based on the total weight of the mixture. In at least one specific embodiment, one or more waxes, e.g., slack wax, can be present in the mixture and the amount of wax can range from a low of about 0.1 wt %, about 0.5 wt %, or about 0.9 wt % to a high of about 1.5 wt %, about 2 wt %, or about 3 wt %, based on the dry weight of the lignocellulose substrates.

The composite product can have a density from a low of about 0.5 g/cm$^3$, about 0.55 g/cm$^3$, about 0.6 g/cm$^3$, about 0.63 g/cm$^3$, about 0.65 g/cm$^3$, about 0.67 g/cm$^3$, or about 0.7 g/cm$^3$ to a high of about 0.75 g/cm$^3$, about 0.77 g/cm$^3$, about 0.8 g/cm$^3$, about 0.83 g/cm$^3$, about 0.85 g/cm$^3$, about 0.88 g/cm$^3$, about 0.93 g/cm$^3$, about 0.97 g/cm$^3$, or about 1 g/cm$^3$. For example, the composite product can have a density of about 0.7 g/cm$^3$ to about 0.75 g/cm$^3$, about 0.65 g/cm$^3$ to about 0.85 g/cm$^3$, about 0.65 g/cm$^3$ to about 0.8 g/cm$^3$, about 0.67 g/cm$^3$ to about 0.77 g/cm$^3$, about 0.5 g/cm$^3$, to about 1 g/cm$^3$, about 0.5 g/cm$^3$, to about 0.8 g/cm$^3$, about 0.5 g/cm$^3$ to about 0.75 g/cm$^3$, or about 0.64 g/cm$^3$ to about 0.8 g/cm$^3$. In one or more embodiments, the composite product can have density less than 1 g/cm$^3$, less than 0.95 g/cm$^3$, less than 0.88 g/cm$^3$, less than 0.85 g/cm$^3$, less than 0.83 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$.

The composite product can have an internal bond strength from a low of about 0.3 MPa, about 0.32 MPa, about 0.34 MPa, about 0.35 MPa, about 0.37 MPa, about 0.4 MPa, about 0.42 MPa, about 0.48 MPa, about 0.52 MPa, about 0.55 MPa, or about 0.58 MPa to a high of about 0.69 MPa, about 0.75 MPa, about 0.83 MPa, about 0.9 MPa, about 0.97 MPa, about 1.05 MPa, about 1.15 MPa, about 1.2 MPa, about 1.25 MPa, about 1.3 MPa, about 1.35 MPa, about 1.4 MPa, about 1.45 MPa, about 1.5 MPa, about 1.55 MPa, about 1.6 MPa, or about 1.7 MPa, with suitable ranges including the combination of any two values. For example, the composite product can have an internal bond strength of about 0.35 MPa to about 0.55 MPa, about 0.4 MPa to about 0.6 MPa, about 0.48 MPa to about 0.69 MPa, about 0.59 MPa to about 0.86 MPa, about 0.55 MPa to about 0.9 MPa, or about 0.51 MPa to about 0.85 MPa. In one or more embodiments, the composite product can have an internal bond strength of at least 0.33 MPa, at least 0.32 MPa, at least 0.34 MPa, at least 0.38 MPa, at least 0.41 MPa, at least 0.45 MPa, at least 0.48 MPa, at least 0.51 MPa, at least 0.55 MPa, at least 0.58 MPa, at least 0.62 MPa, at least 0.66 MPa, at least 0.69 MPa, at least 0.72 MPa, at least 0.76 MPa, or at least 0.79 MPa. The internal bond strength for each example can be determined according to the test procedure provided for in ASTM D1037-06a.

In one or more embodiments, the composite product can have a density less than 1 g/cm$^3$, less than 0.95 g/cm$^3$, less than 0.9 g/cm$^3$, less than 0.85 g/cm$^3$, less than 0.8 g/cm$^3$, less than 0.79 g/cm$^3$, less than 0.78 g/cm$^3$, less than 0.77 g/cm$^3$, less than 0.76 g/cm$^3$, less than 0.75 g/cm$^3$, less than 0.74 g/cm$^3$, or less than 0.73 g/cm$^3$ and an internal bond strength of at least 0.3 MPa, at least 0.35 MPa, at least 0.4 MPa, at least 0.48 MPa, at least 0.51 MPa, at least 0.55 MPa, at least 0.58 MPa, at least 0.62 MPa, at least 0.65 MPa, or at least 0.69 MPa. In at least one specific example, the composite product can have a density less than 0.8 g/cm$^3$ and internal bond strength of at least 0.48 MPa. In at least one other specific example, the composite product can have a density less than 0.8 g/cm$^3$ and internal bond strength of at least 0.69 MPa. In at least one other specific example, the composite product can have a density of less than 0.73 g/cm$^3$ and internal bond strength of at least 0.48 MPa. In still another example, the composite product can have a density of less than 0.73 g/cm$^3$ and internal bond strength of at least 0.58 MPa.

Composite products such as particleboard, fiberboard, plywood, and oriented strand board, can have a thickness or average thickness from a low of about 1.5 mm, about 5 mm, or about 10 mm to a high of about 15 mm, about 20 mm, about 25 mm, about 30 mm, about 50 mm, about 100 mm, about 200 mm, or about 300 mm, with suitable ranges including the combination of any two values. Composite products such as particleboard, fiberboard, plywood, and oriented strand board can have a length of about 0.1 m, about 0.5 m, about 1 m, about 1.2 m, about 1.8 m, about 2.4 m, about 3 m, or about 3.6 m. The composite products can also have a width of about 0.1 m, about 0.5 m, about 1 m, about 1.2 m, about 1.8 m, about 2.4 m, or about 3 m.

The mixtures discussed and described herein can be free or essentially free of formaldehyde for use in the production of the composite products, e.g., wood products such as particleboard and plywood. As used herein, the term "essentially free of formaldehyde" means the mixture does not include or contain any intentionally added formaldehyde or compounds that can decompose, react, or otherwise form formaldehyde. Said another way, the term "essentially free of formaldehyde" means the mixture does not contain formaldehyde or compounds that can form formaldehyde, but may include formaldehyde present as an impurity. Accordingly, depending on the particular multifunctional aldehyde(s) used to produce the mixtures discussed and described herein, the mixture can be referred to as "no added formaldehyde" or "NAF" mixture.

The composite products discussed and described herein can exhibit a low level of formaldehyde emission. A suitable test for determining formaldehyde emission from a composite product can include ASTM D6007-02 and AST E1333-10. For example, the composite products can exhibit a formaldehyde emission of zero. In another example, the composite products can exhibit a formaldehyde emission of less than about 1 part per million ("ppm"), less than about 0.9 ppm, less than about 0.08 ppm, less than about 0.07 ppm, less than about 0.06 ppm, less than about 0.05 ppm, less than about 0.04 ppm, less than about 0.03 ppm, less than about 0.02 ppm, less than about 0.01 ppm, or less than about 0.005 ppm.

The composite product can meet or exceed the formaldehyde emission standards required by the California Air Resources Board ("CARB") Phase 1 (less than 0.1 parts per million "ppm" formaldehyde for particleboard), and Phase 2 (less than 0.09 ppm formaldehyde for particleboard). The composite products discussed and described herein can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

A series of catalysts were used to produce particleboard panels, namely, comparative examples C1 and C2 and inventive examples Ex. 1-7. For all examples, 2,100 grams of face-grade wood particles (Southern Yellow Pine) was placed in 0.0283 m$^3$ blender. The wood particles had a moisture content of 5 wt % to 7 wt %. To the wood furnish was added ammonium lignosulfonate in both liquid form and powder form, an iron containing catalyst, and 50 wt % hydrogen peroxide solution.

The additional components of the mixture were sprayed onto the wood particles in the following order and amounts: (1) 7 wt % of ammonium lignosulfonate (46 wt % to 49 wt % aqueous mixture) mixed with 0.1 wt % catalyst (which differed for each example); (2) 5 wt % of the hydrogen peroxide, and (3) 3 wt % of the powdered ammonium lignosulfonate, where the amount of each component is based on the dry weight of the wood particles. The catalysts used in comparative examples C1 and C2 were FeSO$_4$×7H$_2$O, and NH$_4$Fe(SO$_4$)$_2$×12H$_2$O, respectively. The catalyst used in inventive examples 1-7 were potassium ferricyanide (K$_3$[Fe(CN)$_6$]), iron ethylenediaminetetraacetic acid (Fe EDTA), iron ethylenediaminetetraacetic acid (Fe EDTA), iron (S,S')-ethylenediamine-N,N'-disuccinic acid (Fe EDDS), iron diethylenetriamine pentaacetic acid (Fe DTPA), iron ethyleneglycol bis(2-aminoethyleter)-N,N,N', N'-tetraacetic acid (Fe EGTA), and iron trans-1,2-diaminocyclohexanetetraacetic acid (Fe CDTA), respectively. The aqueous ammonium lignosulfonate was ARBO®A02L provided by Tembec. The powdered ammonium lignosulfonate was ARBO®A02P provided by Tembec.

The FeSO$_4$×7H$_2$O and NH$_4$Fe(SO$_4$)$_2$×12H$_2$O were both purchased from Sigma-Aldrich and each had a purity of ≥99.0%. The (K$_3$[Fe(CN)$_6$]) was purchased from J. T. Baker Chemical Co. and had a purity of 99.5%. The Fe EDTA was purchased from Acros Organic and had a purity of 98%. The FeCl$_3$ was purchased from Sigma-Aldrich and had a purity of 97%. The EDDS was purchased from Sigma-Aldrich as a 35% aq. trisodium salt solution. The DTPA was purchased from Sigma-Aldrich and had a purity of 98%. The EGTA was purchased from Sigma-Aldrich as a tetrasodium salt and had a purity of ≥97.0%. The CDTA monohydrate was purchased from Fluka and had a purity of ≥98.5%. Iron chelates were made by mixing 1.0 equiv. of aqueous solution of FeCl3 with 1.05 equiv. of aqueous solution of the corresponding sodium salt of the chelate at room temperature. Sodium salts of DTPA and CDTA chelates were made by the addition of sodium hydroxide to the corresponding chelate. Freshly prepared iron chelate solutions were used in the experiments.

The mixture or "resinated furnish" had a total moisture content of 17 wt % to 18 wt % and was blended for an additional 2 minutes after adding the powdered ammonium lignosulfonate. The resinated furnish was placed in a 33 cm×45.7 cm×20.3 cm open container for 30 minutes during which time the temperature of the resinated furnish was measured. For each example, the initial or starting temperature of the resinated furnish varied due to one or more factors, which included the initial temperature of the wood particles varying due how long the wood particles were allowed to cool after drying, the ambient temperature on the given day of the experiments which took place from January to July, and, as can be seen in Table 1, for the comparative examples C1 and C2 the components of the furnish were highly reactive with one another compared to Ex. 1-7 and heat generated upon or shortly after formation of the mixture contributed to the differences in initial starting temperatures. The temperature of each resinated furnish during the 30 minutes is shown in Table 1 below.

was tested according to ASTM D1037-06a. Each particleboard panel had a thickness of 1.59 cm+/−0.3 cm. The particleboard density and internal bond strength for each sample are shown in Table 2 below.

TABLE 2

| Example | Catalyst | Density, g/cm$^3$ | IB, MPA |
|---------|----------|-------------------|---------|
| C1 | $FeSO_4 \times 7H_2O$ | 0.774 | 0.49 |
| C2 | $NH_4Fe(SO4)_2 \times 12H_2O$ | 0.770 | 0.185 |
| Ex. 1 | $K_3[Fe(CN)_6]$ | 0.803 | 0.772 |
| Ex. 2 | Fe EDTA | 0.745 | 0.591 |
| Ex. 3 | Fe EDTA | 0.748 | 0.607 |
| Ex. 4 | Fe EDDS | 0.742 | 0.458 |
| Ex. 5 | Fe DTPA | 0.769 | 0.403 |
| Ex. 6 | Fe EGTA | 0.798 | 0.556 |
| Ex. 7 | Fe CDTA | 0.775 | 0.383 |

As shown in Table 2, all inventive examples Ex. 1-7 had an IB strength of 0.383 MPa or more. Comparative example C2 had a significantly lower IB strength of 0.185 MPa. Comparative example C1 had a comparable IB strength of 0.490 MPa, but the resinated furnish exceeded 100° C.

TABLE 1

| Time, min. | C1, $FeSO_4 \times 7H_2O$ Temp, ° C. | C2, $NH_4Fe(SO_4)_2 \times 12H_2O$ Temp, ° C. | Ex. 1, $K_3[Fe(CN)_6]$ Temp, ° C. | Ex. 2, Fe EDTA Temp, ° C. | Ex. 3, Fe EDTA Temp, ° C. | Ex. 4, Fe EDDS Temp, ° C. | Ex. 5, Fe DTPA Temp, ° C. | Ex. 6, Fe EGTA Temp, ° C. | Ex. 7, Fe CDTA Temp, ° C. |
|---|---|---|---|---|---|---|---|---|---|
| 2 | 34.4 | — | 26.8 | 25.1 | 26.6 | — | — | 36.4 | 29.1 |
| 3 | — | 34.3 | — | — | — | 33.6 | 34.0 | — | — |
| 4 | 36.3 | — | 27.7 | 25.7 | 26.8 | — | — | 37.6 | 29.2 |
| 6 | — | 36.7 | 29.7 | 26.4 | — | 34.0 | 34.1 | 38.4 | 29.4 |
| 8 | — | — | 29.7 | — | 27.0 | 34.2 | 34.2 | — | — |
| 9 | — | — | — | — | — | — | — | — | 29.6 |
| 10 | — | — | — | 26.4 | 27.1 | 34.5 | — | 40.4 | — |
| 11 | — | — | — | — | — | — | — | — | 29.8 |
| 12 | 41.4 | 44.0 | — | 26.5 | — | — | — | 41.5 | — |
| 13 | — | — | — | — | — | 34.7 | — | — | 30.0 |
| 14 | — | — | 28.7 | 26.6 | — | — | 34.7 | 42.8 | — |
| 15 | — | — | — | — | 27.3 | — | — | — | 30.2 |
| 16 | — | — | 29.1 | 26.8 | — | — | — | — | — |
| 18 | 47.9 | 64.0 | — | 26.9 | 27.4 | — | 34.9 | — | — |
| 19 | — | — | — | 26.9 | — | 35.2 | — | — | 30.4 |
| 20 | — | — | 29.4 | 26.9 | 27.5 | — | 35.0 | 47.7 | — |
| 21 | — | 90.6 | — | — | — | — | — | — | — |
| 22 | 56.8 | 104.0 | — | — | — | — | 35.1 | — | — |
| 23 | — | — | — | — | — | — | — | — | 30.6 |
| 24 | 65.7 | 104.0 | 29.7 | — | — | 35.4 | 35.1 | — | — |
| 25 | — | 104.0 | — | — | — | — | — | 51.5 | — |
| 26 | 83.8 | — | — | — | — | 35.5 | 35.0 | — | — |
| 27 | 98.2 | 102.0 | — | — | — | — | — | — | — |
| 28 | 105.1 | — | 30.0 | — | 27.9 | 35.5 | — | 54.8 | — |
| 30 | 106.8 | 98.4 | 30.1 | — | 28.0 | 35.6 | 35.0 | 57.4 | 30.8 |

As shown in Table 1, the resinated furnish of comparative examples C1 and C2 all exceeded a temperature of 40° C. in less than 30 minutes. In fact, all of the comparative examples C1 and C2 exceeded 100° C. In direct contrast, none of the inventive examples Ex. 1-7 exceeded a temperature of 60° C. over the 30 minute duration.

After the 30 minutes in the a 33 cm×45.7 cm×20.3 cm open container, the resinated furnish was formed into a 40.64 cm×40.64 cm×5.08 cm mat and a particleboard panel was pressed to stops configured to produce a panel having a thickness of 1.59 cm+/−0.3 cm for 4 minutes at 165.5° C.+/−5.5° C. (total press time of 240 seconds consisted of 30 seconds closing time, 180 seconds press time, and 30 seconds degas time). The particleboard samples were then cooled to room temperature and internal bond (IB) strength within 30 minutes. When the resinated furnish exceeds 100° C. a substantial amount of heat and steam can be generated, which in addition to being undesirable from a manufacturing standpoint, also presents a safety hazard to people involved in the manufacturing of composite products. Particleboard panels having an IB of about 0.350 MPa or more are useful for numerous applications, which include, but are not limited to, furniture, cabinetry, flooring, and wall units.

Example II

In Example II four examples were prepared, namely, a Control, and inventive examples Ex. 8-10 and the amount of oxidant (hydrogen peroxide) that remained present in each example after 30 minutes was determined. Face-grade wood particles (Southern Yellow Pine) in the amount of 2,100 g was placed in 0.0283 m³ blender. The wood particles had a moisture content of 5 wt % to 7 wt %. The Control example included only hydrogen peroxide, i.e., no catalyst, wood particles, or ammonium lignosulfonate were present. For Example 8, the following components were added to the wood particles in the form a fine mist while blending to produce the resinated furnish: a) 7 wt % of ammonium lignosulfonate (46 wt % to 49 wt % aqueous mixture), b) 5 wt % of hydrogen peroxide (50% aq.), and c) 3 wt % of powdered ammonium lignosulfonate, where the amount of each component was based on the dry weight of the wood particles. For Examples 9 and 10, the following components were added to the wood particles while blending to produce the resinated furnish: a) 7 wt % of ammonium lignosulfonate (46 wt % to 49 wt % aqueous mixture) mixed with 0.275 wt % FeEDTA (Ex. 9) and 0.22 wt % $K_3[Fe(CN)_6]$ (Ex. 10), respectively, b) 5 wt % of hydrogen peroxide (50% aq.), and c) 3 wt % of powdered ammonium lignosulfonate, where the amount of each component was based on the dry weight of the wood particles.

The resinated furnishes of Examples 8-10 (moisture content 17-18%) were blended for an additional 2 min and then placed in a 33 cm×45.7 cm×20 cm open container for 30 min during which time the temperature of the resinated furnish was measured. A representative sample of each resinated wood furnish in the amount of 20 g was transferred to plastic container and 200 g of deionized water was added. For the control sample, 0.95 g of the $H_2O_2$ was transferred to a plastic container and 400 g of deionized water was added thereto. The $H_2O_2$ content was then analyzed using triphenylphosphine, as further discussed below. For Examples 8-10, the mixtures were hand stirred for 5 min and poured into a funnel equipped with filter paper. For Examples 8 and 10, the filtrates were collected and the wood furnish was rinsed two more times with an additional 800 g of deionized water (2 separate rinses of 400 g each). For Example 9, the filtrate was collected and the wood furnish was rinsed one additional time with 400 g of deionized water.

For Examples 8-10, the rinsed filtrates were diluted by adding 1 mL of filtrate to a 100 mL volumetric flask and the remainder of the flask was filled with water. A 2.0 mM solution of triphenylphosphine in acetonitrile was then prepared. 1 mL of each solution was mixed together in a plastic container and stored in the dark for 30 minutes during which time the triphenylphosphine oxidized to triphenylphosphine oxide. The triphenylphosphine oxide concentration was measured by HPLC. The triphenylphosphine and triphenylphosphine oxide (used for calibration curve) were purchased from Aldrich and had a purity of 99% and 98%, respectively. The analytical procedure using the triphenylphosphine in acetonitrile to determine the hydrogen peroxide content was conducted according to the procedure discussed and described in Pinkernell, U.; Effkemann, S.; Karst, U., *Anal. Chem.* 1997, 69, 3623-3627.

The results are shown in Table 3 below.

TABLE 3

| | Components | % $H_2O_2$ retained |
|---|---|---|
| Control | $H_2O_2$ | 98 |
| Ex. 8 | ALS + $H_2O_2$ | 81 |
| Ex. 9 | ALS + FeEDTA + $H_2O_2$ | 63 |
| Ex. 10 | ALS + $K_3[Fe(CN)_6]$ + $H_2O_2$ | 83 |

As shown in Table 3, the control example only lost 2% of the hydrogen peroxide, which should be due to experimental error and/or decomposition of the hydrogen peroxide caused by light during the 30 minute monitoring step. Examples 8-10 each had a hydrogen peroxide concentration of 81%, 63%, and 83%, respectively, that remained present after the minute monitoring step. Without wishing to be bound by theory, it is believed that Ex. 9 showed a greater decrease in the $H_2O_2$ content due to rinsing the mixture only once, which most likely was insufficient to recover the additional $H_2O_2$. Also, without wishing to be bound by theory it is believed that the $H_2O_2$ not recovered could be due to decomposition of hydrogen peroxide, there may be an equilibrium between the $H_2O_2$ and the furnish, and/or the $H_2O_2$ may react with some components of the wood that can be oxidized by just $H_2O_2$.

Embodiments of the present disclosure further relate to any one or more of the following paragraphs:

1. A method for making a composite product, comprising: combining a plurality of lignocellulose substrates and one or more free radical precursors to produce a mixture; maintaining the mixture at a temperature less than 60° C. for at least 10 minutes; and heating the mixture to a temperature of at least 60° C. to about 300° C. to produce a composite product having a density less than 1 g/cm³ and an internal bond strength of at least 0.35 MPa, wherein at least 1 wt % of the one or more free radical precursors is present when the mixture is heated to at least 60° C., based on a dry weight of the plurality of lignocellulose substrates.

2. A method for making a composite product, comprising: combining a plurality of lignocellulose substrates and one or more free radical precursors to produce a mixture; maintaining the mixture at a temperature less than 60° C. for at least 10 minutes; and heating the mixture to a temperature of at least 60° C. to about 300° C. to produce a composite product having a density less than 1 g/cm³ and an internal bond strength of at least 0.35 MPa, wherein at least 11 wt % of the one or more free radical precursors is present when the mixture is heated to at least 60° C.

3. A method for making a composite product, comprising: combining a plurality of lignocellulose substrates, one or more free radical precursors, and one or more compounds selected from the group consisting of: lignins, tannins, novolac resins, modified phenol formaldehyde resin, bisphenol A, humic acids, and any mixture thereof to produce a mixture; and heating the mixture to a temperature of about 60° C. to about 300° C. to produce a composite product, wherein at least 11 wt % of the one or more free radical precursors is present when the mixture is heated to at least 60° C.

4. The method according to paragraph 3, wherein the composite produce has a density less than 1 g/cm³ and an internal bond strength of at least 0.35 MPa.

5. The method according to paragraph 4, wherein an amount of the one or more free radical precursors present when the mixture is heated to about 60° C. to about 300° C. is at least 1 wt %, based on a dry weight of the plurality of lignocellulose substrates.

6. A method for making a composite product, comprising: combining a plurality of lignocellulose substrates, one or more free radical precursors, and one or more compounds comprising at least two hydrogen atoms that are abstractable in the presence of hydroxyl radicals to produce a mixture; and heating the mixture to a temperature of about 60° C. to about 300° C. to produce a composite product, wherein at least 11 wt % of the one or more free radical precursors is present when the mixture is heated to about 60° C. to about 300° C.

7. The method according to paragraph 6, wherein the composite product has a density less than 1 g/cm³ and an internal bond strength of at least 0.35 MPa.

8. The method according to paragraph 6, wherein an amount of the one or more free radical precursors present when the mixture is heated to about 60° C. is at least 1 wt %, based on a dry weight of the plurality of lignocellulose substrates.

9. A method for preparing a composite product, comprising: combining a plurality of lignocellulose substrates, one or more oxidants, and one or more catalysts to produce a mixture, wherein the one or more catalysts comprises a plurality of transition metal atoms each bound to a corresponding complexing agent; and heating the mixture to a temperature of about 60° C. to about 300° C. to produce a composite product having a density less than 1 g/cm³ and an internal bond strength of at least 0.35 MPa, wherein at least 1 wt % of the one or more catalysts comprising the plurality of transition metal atoms each bound to the corresponding complexing agent is present when the mixture is heated to about 60° C. to about 300° C., based on a dry weight of the plurality of lignocellulose substrates.

10. The method according to any one of paragraphs 1 to 8, wherein the one or more free radical precursors comprises a mixture of one or more oxidants and one or more catalysts.

11. The method according to any one of paragraphs 1 to 8 or 10, wherein the one or more free radical precursors comprises a mixture of hydrogen peroxide and one or more iron containing catalysts.

12. The method according to any one of paragraphs 1 to 8, 10, or 11, wherein the one or more free radical precursors generate radicals when heated to a temperature from about 60° C. to about 300° C.

13. The method according to any one of paragraphs 1 to 5 or 9, further comprising combining one or more compounds comprising at least two hydrogen atoms that are abstractable in the presence of hydroxyl radicals.

14. The method according to paragraph 13, wherein the one or more compounds comprising at least two hydrogen atoms that are abstractable in the presence of hydroxyl radicals comprises lignin, tannins, novolac, bis-phenol A, modified phenol formaldehyde resin, humic acids or any mixture thereof.

15. The method according to paragraph 14, wherein the lignin is present and comprises ammonium lignosulfonate, sodium lignosulfonate, or a mixture thereof.

16. The method according to any one of paragraphs 1 to 15, further comprising pressing the mixture to a pressure greater than atmospheric pressure when the mixture is heated.

17. The method according to any one of paragraphs 1 to 16, further comprising pressing the mixture to a pressure of about 0.1 MPa to about 10 MPa when the mixture is heated.

18. The method according to any one of paragraphs 1 to 17, wherein the composite product is in the form of a panel having an average thickness, and wherein the mixture is heated for about 3 seconds to about 20 seconds per millimeter of the average thickness.

19. The method according to any one of paragraphs 1 to 18, wherein the composite product is in the form of a panel having an average thickness, and wherein the mixture is heated for about 10 seconds to about 18 seconds per millimeter of the average thickness.

20. The method according to paragraph 1 or 2, wherein the mixture is maintained at the temperature less than 60° C. for at least 15 minutes.

21. The method according to paragraph 1 or 2, wherein the mixture is maintained at the temperature less than 60° C. for at least 20 minutes.

22. The method according to paragraph 1 or 2, wherein the mixture is maintained at the temperature less than 60° C. for at least 25 minutes.

23. The method according to paragraph 1 or 2, wherein the mixture is maintained at the temperature less than 60° C. for at least 30 minutes.

24. The method according to any one of paragraphs 1 to 23, wherein the composite product has an internal bond strength of at least 0.4 MPa.

25. The method according to any one of paragraphs 1 to 24, wherein the composite product has a density from about 0.5 g/cm³ to less than 1 g/cm³.

26. The method according to any one of paragraphs 1 to 25, wherein the composite product has an internal bond strength of at least 0.5 MPa and a density of less than 0.9 g/cm³.

27. The method according to any one of paragraphs 1 to 26, wherein the composite product has a density from about 0.5 g/cm³ to about 0.85 g/cm³.

28. The method according to any one of paragraphs 1 to 27, wherein the composite product has an internal bond strength of at least 0.5 MPa and a density of less than 0.8 g/cm³.

29. The method according to any one of paragraphs 1 to 8, wherein the one or more free radical precursors comprises one or more catalysts, and wherein the one or more catalysts comprises one or more metals in the form of a complex bound to one or more complexing agents.

30. The method according to paragraph 29, wherein the one or more catalysts comprises one or more metals.

31. The method according to paragraph 30, wherein the one or more complexing agents comprises cyanide ($CN^-$), sulfate ($SO_4^{2-}$), ethylenediaminetetraacetic acid (EDTA), ethylenediamine-N,N'-disuccinic acid (EDDS ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof.

32. The method according to paragraph 30 or 31, wherein the one or more metals comprises iron, copper, manganese, tungsten, molybdenum, cobalt, titanium, or any mixture thereof.

33. The method according to any one of paragraphs 9 or 30 to 32, wherein the one or more catalysts comprises one or more metal ions of iron, copper, manganese, tungsten, molybdenum, cobalt, titanium, or any combination thereof; one or more tertiary amines; polymeric tertiary amines; polyamines, or a combination thereof.

34. The method according to paragraph 9, wherein the one or more catalysts is selected from the group consisting of: potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, and any mixture thereof.

35. The method according to paragraph 9 or 30, wherein an amount of the one or more catalysts present in the mixture is from about 0.05 wt % to about 5 wt %, based on a dry weight of the plurality of lignocellulose substrates.

36. The method according to paragraph 9, further comprising combining one or more polyphenolic compounds with the plurality of lignocellulose substrates, the one or more oxidants, and the one or more catalysts to produce the mixture.

37. The method according to paragraph 36, wherein the one or more polyphenolic compounds is selected from the group consisting of: lignin, tannins, a novolac resin, modified phenol formaldehyde resin, humic acids, or any combination thereof.

38. The method according to paragraph 37, wherein the lignin is present and comprises ammonium lignosulfonate.

39. The method according to any one of paragraphs 36 to 38, wherein the one or more polyphenolic compounds is present in the mixture in an amount of about 1 wt % to about 30 wt %, based on a dry weight of the plurality of lignocellulose substrates.

40. The method according to any one of paragraphs 36 to 39, wherein the polyphenolic compound is modified with one or more compounds having carbon-carbon double bonds and one or more functional groups.

41. The method according to paragraph 40, wherein the one or more compounds having carbon-carbon double bonds and one or more functional groups is selected from the group consisting of: an unsaturated glycidyl ether, an unsaturated glycidyl ester, an unsaturated mono-epoxide, an unsaturated methylol compound, maleic anhydride, or any mixture thereof.

42. The method according to paragraph 40 or 41, wherein the polyphenolic compound modified with the one or more compounds having carbon-carbon double bonds and one or more functional groups is present in an amount of about 2 wt % to about 30 wt %, based on a dry weight of the plurality of lignocellulose substrates.

43. The method according to any one of paragraphs 1 to 8 or 10 to 42, wherein the one or more free radical precursors is present in the mixture in an amount of about 1 wt % to about 15 wt %, based on a dry weight of the plurality of lignocellulose substrates.

44. The method according to paragraph 43, wherein the one or more free radical precursors comprises hydrogen peroxide.

45. The method according to paragraph 9, wherein the one or more oxidants comprises one or more inorganic peroxy compounds, one or more organic peroxy compounds, or a combination thereof.

46. The method according to paragraph 9, wherein the one or more oxidants comprises hydrogen peroxide.

47. The method according to paragraph 9, wherein an amount of the one or more oxidants present in the mixture is from about 1 wt % to about 15 wt %, based on a dry weight of the plurality of lignocellulose substrates, and wherein an amount of the one or more catalysts present in the mixture is from about 0.05 wt % to about 5 wt %, based on the dry weight of the plurality of lignocellulose substrates.

48. The method according to any one of paragraphs 1 to 47, wherein the composite product comprises a particleboard, a fiberboard, a plywood, an oriented strand board, a laminated veneer lumber, or a laminated veneer board.

49. The method according to paragraph 9, wherein at least 15 wt % of the oxidant is present when the mixture is heated to at least 60° C.

50. The method according to paragraph 9, wherein at least 20 wt % of the oxidant is present when the mixture is heated to at least 60° C.

51. The method according to paragraph 9, wherein at least 50 wt % of the oxidant is present when the mixture is heated to at least 60° C.

52. A composite product, comprising: an at least partially cured composition having a density less than 1 g/cm$^3$ and an internal bond strength of at least 0.35 MPa, wherein the at least partially cured composition, prior to curing, comprises a plurality of lignocellulose substrates, one or more free radical precursors, and one or more compounds selected from the group consisting of: lignins, tannins, novolac resins, bis-phenol A, modified phenol formaldehyde resin, humic acids, and any mixture thereof.

53. A composite product, comprising: an at least partially cured composition having a density less than 1 g/cm$^3$ and an internal bond strength of at least 0.35 MPa, wherein the composition, prior to curing, comprises a plurality of lignocellulose substrates, one or more free radical precursors, and one or more compounds comprising at least two hydrogen atoms that are abstractable in the presence of hydroxyl radicals.

54. A composite product comprising a mixture that has been heated to a temperature from about 60° C. to about 300° C., wherein the mixture, prior to being heated, comprises a plurality of lignocellulose substrates, one or more free radical precursors, and one or more compounds selected from the group consisting of: lignins, tannins, novolac resins, bis-phenol A, modified phenol formaldehyde resin, humic acids, and any mixture thereof, and wherein the heated mixture has an internal bond strength of at least 0.35 MPa and a density less than 1 g/cm$^3$.

55. A composite product comprising a mixture that has been heated to a temperature from about 60° C. to about 300° C., wherein the mixture, prior to being heated, comprises a plurality of lignocellulose substrates, one or more free radical precursors, and one or more compounds comprising at least two hydrogen atoms that are abstractable in the presence of hydroxyl radicals, and wherein the heated mixture has an internal bond strength of at least 0.35 MPa and a density less than 1 g/cm$^3$.

56. A composite product having an internal bond strength of at least 0.35 MPa and a density less than 1 g/cm$^3$, wherein the composite product comprises a cured mixture of a plurality of lignocellulose substrates, one or more free radical precursors, and one or more compounds selected from the group consisting of: lignins, tannins, novolac resins, bis-phenol A, modified phenol formaldehyde resin, humic acids, and any mixture thereof.

57. A composite product having an internal bond strength of at least 0.35 MPa and a density less than 1 g/cm$^3$, wherein the composite product comprises a cured mixture of a plurality of lignocellulose substrates, one or more free radical precursors, and one or more compounds comprising at least two hydrogen atoms that are abstractable in the presence of hydroxyl radicals.

58. A composite product having an internal bond strength of at least 0.35 MPa and a density less than 1 g/cm$^3$, wherein the composite product comprises a mixture that has been heated to a temperature from about 60° C. to about 300° C., and wherein prior to heating the mixture comprises a plurality of lignocellulose substrates, one or more free radical precursors, and one or more compounds selected from the group consisting of: lignins, tannins, novolac resins, bis-phenol A, modified phenol formaldehyde resin, humic acids, and any mixture thereof.

59. A composite product having an internal bond strength of at least 0.35 MPa and a density less than 1 g/cm$^3$, wherein the composite product comprises a mixture that has been heated to a temperature from about 60° C. to about 300° C., and wherein prior to heating the mixture comprises a plurality of lignocellulose substrates, one or more free radical precursors, and one or more compounds comprising at least two hydrogen atoms that are abstractable in the presence of hydroxyl radicals.

60. The composite product according to any one of paragraphs 52 to 59, wherein the internal bond strength of the composite product is at least 0.4 MPa.

61. The composite product according to any one of paragraphs 52 to 59, wherein the internal bond strength of the composite product is at least 0.45 MPa.

62. The composite product according to any one of paragraphs 52 to 59, wherein the internal bond strength of the composite product is at least 0.5 MPa.

63. The composite product according to any one of paragraphs 52 to 59, wherein the composite product has an internal bond strength of at least 0.4 MPa and a density of less than 0.9 g/cm$^3$.

64. The composite product according to any one of paragraphs 52 to 59, wherein the composite product has an internal bond strength of at least 0.4 MPa and a density of less than 0.85 g/cm$^3$.

65. The composite product according to any one of paragraphs 52 to 59, wherein the composite product has an internal bond strength of at least 0.4 MPa and a density of less than 0.8 g/cm$^3$.

66. The composite product according to any one of paragraphs 52 to 59, wherein the composite product has an internal bond strength of at least 0.4 MPa and a density of less than 0.75 g/cm$^3$.

67. The composite product according to any one of paragraphs 52 to 59, wherein the composite product has an internal bond strength of at least 0.5 MPa and a density of less than 0.9 g/cm$^3$.

68. The composite product according to any one of paragraphs 52 to 59, wherein the density of the composite product is less than about 0.9 g/cm$^3$.

69. The composite product according to any one of paragraphs 52 to 59, wherein the density of the composite product is less than about 0.85 g/cm$^3$.

70. The composite product according to any one of paragraphs 52 to 59, wherein the density of the composite product is less than about 0.8 g/cm$^3$.

71. The composite product according to any one of paragraphs 52 to 59, wherein the density of the composite product is less than about 0.75 g/cm$^3$.

72. The composite product according to any one of paragraphs 52 to 59, wherein the one or more free radical precursors comprises one or more oxidants.

73. The composite product according to any one of paragraphs 52 to 59, wherein the one or more free radical precursors comprises one or more oxidants, and wherein the one or more oxidants comprises one or more inorganic peroxy compounds, one or more organic peroxy compounds, or a combination thereof.

74. The composite product according to any one of paragraphs 52 to 59, wherein the one or more free radical precursors comprises one or more oxidants, and wherein the one or more oxidants comprises hydrogen peroxide.

75. The composite product according to any one of paragraphs 52 to 59, wherein the one or more free radical precursors comprises one or more oxidants and one or more catalysts.

76. The composite product according to paragraph 75, wherein the one or more catalysts comprises one or more metals in the form of a complex bound to one or more complexing agents.

77. The composite product according to paragraph 76, wherein the one or more complexing agents comprises cyanide (CN$^-$), sulfate (SO$_4^{2-}$), ethylenediaminetetraacetic acid (EDTA), ethylenediamine-N,N'-disuccinic acid (EDDS), ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof.

78. The composite product according to paragraph 76 or 77, wherein the one or more metals comprises iron, copper, manganese, tungsten, molybdenum, cobalt, titanium, or any mixture thereof.

79. The composite product according to paragraph 75, wherein the one or more catalysts comprises one or more metal ions of iron, copper, manganese, tungsten, molybdenum, cobalt, titanium, or any combination thereof; one or more tertiary amines; polymeric tertiary amines; polyamines; any mixture thereof; or any combination thereof.

80. The composite product according to paragraph 75, wherein the one or more catalysts is selected from the group consisting of: potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, and any mixture thereof.

81. The composite product according to any one of paragraphs 52 to 80, wherein the composite product is particleboard.

82. The composite product according to paragraph 81, wherein the particleboard is grade M-3i as defined by ANSI A208.1-2009 Particleboard.

83. The composite product according to paragraph 81, wherein the particleboard is grade M-2 as defined by ANSI A208.1-2009 Particleboard.

84. The composite product according to paragraph 81, wherein the particleboard is grade M-S as defined by ANSI A208.1-2009 Particleboard.

85. The composite product according to paragraph 81, wherein the particleboard is grade M-1 as defined by ANSI A208.1-2009 Particleboard.

86. The composite product according to paragraph 81, wherein the particleboard is grade M-0 as defined by ANSI A208.1-2009 Particleboard.

87. The composite product according to paragraph 81, wherein the particleboard is grade H-3 as defined by ANSI A208.1-2009 Particleboard.

88. The composite product according to paragraph 81, wherein the particleboard is grade H-2 as defined by ANSI A208.1-2009 Particleboard.

89. The composite product according to paragraph 81, wherein the particleboard is grade H-1 as defined by ANSI A208.1-2009 Particleboard.

90. The composite product according to paragraph 81, wherein the particleboard is particleboard flooring and is grade M-3 as defined by ANSI A208.1-2009 Particleboard.

91. The composite product according to paragraph 81, wherein the particleboard is particleboard flooring and is grade D-3 as defined by ANSI A208.1-2009 Particleboard.

92. The composite product according to paragraph 81, wherein the particleboard is particleboard flooring and is grade D-2 as defined by ANSI A208.1-2009 Particleboard.

93. The composite product according to paragraph 81, wherein the particleboard is particleboard flooring and is grade PBU as defined by ANSI A208.1-2009 Particleboard.

94. A method for preparing a composite product, comprising: combining a plurality of lignocellulose substrates, one or more oxidants, and one or more catalysts to produce a mixture, wherein the one or more catalysts is selected from the group consisting of: potassium ferricyanide, an iron complex of (S,S')-ethylenediamine-N,N'-disuccinic acid, an iron complex of ethyleneglycol-bis(2-aminoethyl)-N,N,N', N'-tetraacetic acid, an iron complex of trans-1,2-diaminocyclohexanetetraacetic acid, and any mixture thereof; and heating the mixture to a temperature of about 60° C. to about 230° C. to produce a composite product.

95. The method according to paragraph 94, wherein at least 11 wt % of the oxidant is present when the mixture is heated to at least 60° C.

96. The method according to paragraph 95, further comprising maintaining the mixture at a temperature less than 60° C. for at least 10 minutes before the mixture is heated to the temperature of at least 60° C. to about 230° C. to produce the composite product.

97. The method according to any one of paragraphs 94 to 96, wherein the composite product has an internal bond strength of at least 0.35 MPa.

98. The method according to any one of paragraphs 94 to 97, wherein the composite product has a density from about 0.5 g/cm$^3$ to about 1 g/cm$^3$.

99. The method according to any one of paragraphs 94 to 98, wherein the composite product has an internal bond strength of at least 0.35 MPa and a density of less than 1 g/cm$^3$.

100. The method according to any one of paragraphs 94 to 99, further comprising combining one or more polyphenolic compounds with the plurality of lignocellulose substrates, the one or more oxidants, and the one or more catalysts to produce the mixture.

101. The method according to paragraph 100, wherein the one or more polyphenolic compounds is selected from the group consisting of: lignin, tannins, novolac resin, or any combination thereof.

102. The method according to paragraph 101, wherein the lignin is present and comprises ammonium lignosulfonate.

103. The method according to any one of paragraphs 94 to 102, wherein the one or more oxidants comprises one or more inorganic peroxy compounds, one or more organic peroxy compounds, or a combination thereof.

104. The method according to paragraph 103, wherein the one or more oxidants comprises hydrogen peroxide.

105. The method according to any one of paragraphs 94 to 104, wherein the one or more oxidants is present in an amount from about 1 wt % to about 15 wt %, based on a dry weight of the lignocellulose substrates.

106. The method according to any one of paragraphs 94 to 105, wherein the composite product comprises a particleboard, a fiberboard, a plywood, an oriented strand board, a laminated veneer lumber, or a laminated veneer board.

107. The method according to paragraph 94, wherein at least 15 wt % of the oxidant is present when the mixture is heated to at least 60° C.

108. The method according to paragraph 93, wherein at least 20 wt % of the oxidant is present when the mixture is heated to at least 60° C.

109. The method according to paragraph 94, wherein at least 50 wt % of the oxidant is present when the mixture is heated to at least 60° C.

110. The method according to paragraph 1 or 2, wherein an amount of energy generated from the mixture due to exothermic reaction(s) between the components of the mixture is less than about 20 cal/g.

111. The method according to any one of paragraphs 3, 6, 9, or 95, wherein prior to heating the mixture to a temperature of about or at least 60° C., an amount of energy generated from the mixture due to exothermic reaction(s) between the components of the mixture is less than about 20 cal/g.

112. The method according to any one of paragraphs 1, 2, 3, or 6, wherein the free radical precursor comprises a compound having the general formula R—N=N—R', wherein R and R' is independently a substituted aryl or a substituted alkyl.

113. The method according to any one of paragraphs 1, 2, 3, or 6, wherein the one or more free radical precursors comprises azobisisobutyronitrile (AIBN).

114. A method for preparing a composite product, comprising: combining a plurality of lignocellulose substrates, one or more oxidants, and one or more catalysts to produce a mixture, wherein the one or more catalysts comprises a transition metal atom bound to a complexing agent; and heating the mixture to a temperature of about 60° C. to about 300° C. to produce a composite product having a density less than 1 g/cm$^3$ and an internal bond strength of at least 0.35 MPa, wherein at least 1 wt % of the one or more catalysts comprising the plurality of transition metal atoms each bound to the corresponding complexing agent is present when the mixture is heated to about 60° C. to about 300° C., based on a dry weight of the plurality of lignocellulose substrates.

115. A method for making a composite product, comprising: combining a plurality of lignocellulose substrates and one or more free radical precursors to produce a mixture; maintaining the mixture at a temperature less than 60° C. for at least 10 minutes; and heating the mixture to a temperature of at least 60° C. to about 300° C. to produce a composite product, wherein an amount of the one or more free radical precursors present when the mixture is heated to at least 60° C. is at least 11 wt % of the one or more free radical precursors combined with the plurality of lignocellulose substrates, and wherein the composite product has a density less than 1 g/cm$^3$ and an internal bond strength of at least 0.35 MPa.

116. A method for making a composite product, comprising: combining a plurality of lignocellulose substrates, one or more free radical precursors, and one or more compounds comprising at least two hydrogen atoms that are abstractable in the presence of hydroxyl radicals to produce a mixture; and heating the mixture to a temperature of at least 60° C. to about 300° C. to produce a composite product, wherein an amount of the one or more free radical precursors present when the mixture is heated to at least 60° C. is at least 11 wt % of the one or more free radical precursors combined with the plurality of lignocellulose substrates and the one or more compounds comprising at least two hydrogen atoms that are abstractable in the presence of hydroxyl radicals.

117. The method according to paragraph 115, wherein the mixture is maintained at the temperature less than 60° C. for at least 20 minutes, and wherein the amount of the one or more free radical precursors present when the mixture is heated to at least 60° C. is at least 25 wt % of the one or more free radical precursors combined with the plurality of lignocellulose substrates.

118. The method according to paragraph 115, wherein the mixture is maintained at the temperature less than 60° C. for at least 30 minutes.

119. The method according to any one of paragraphs 115 to 118, wherein the composite product is in the form of a panel having an average thickness, and wherein the mixture is heated to the temperature of at least 60° C. to about 300° C. for about 3 seconds to about 20 seconds per millimeter of the average thickness.

120. The method according to any one of paragraphs 115 to 119, wherein prior to heating the mixture to the temperature of at least 60° C. to about 300° C. to produce the composite product, an amount of energy generated from the mixture due to any exothermic reaction is less than 20 cal/g.

121. The method according to any one of paragraphs 115 to 120, wherein the composite product has an internal bond strength of at least 0.5 MPa and a density of less than 0.9 g/cm$^3$.

122. The method according to any one of paragraphs 115 to 121, wherein the one or more free radical precursors comprise a mixture of one or more oxidants and one or more catalysts.

123. The method according to paragraph 122, wherein the one or more free radical precursors comprises a mixture of hydrogen peroxide and one or more iron containing catalysts.

124. The method according to paragraph 123, wherein an amount of the one or more iron containing catalysts present in the mixture is from about 0.05 wt % to about 5 wt %, based on a dry weight of the plurality of lignocellulose substrates.

125. The according to any one of paragraphs 115 to 124, wherein the one or more free radical precursors comprise one or more catalysts, and wherein the one or more catalysts comprise one or more metals in the form of a complex bound to one or more complexing agents.

126. The method according to paragraph 125, wherein the one or more complexing agents comprise cyanide (CN$^-$), sulfate (SO$_4^{2-}$), ethylenediaminetetraacetic acid (EDTA), ethylenediamine-N,N'-disuccinic acid (EDDS), ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof.

127. The method according to any one of paragraphs 115 to 126, wherein the one or more free radical precursors comprise one or more catalysts and one or more oxidants, and wherein the one or more catalysts comprise potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

128. The method according to any one of paragraphs 115 to 127, wherein the one or more free radical precursors comprise hydrogen peroxide.

129. The method according to any one of paragraphs 115 or 117 to 128, further comprising combining one or more polyphenolic compounds with the plurality of lignocellulose substrates and the one or more free radical precursors to produce the mixture, wherein the one or more polyphenolic compounds comprise lignin, tannins, a novolac resin, modified phenol formaldehyde resin, bis-phenol A, humic acids, or any mixture thereof.

130. The method according to any one of paragraphs 116 to 130, wherein the mixture is maintained at a temperature less than 60° C. for at least 10 minutes prior to heating the mixture to the temperature of at least 60° C. to about 300° C., and wherein the composite product has a density less than 1 g/cm$^3$ and an internal bond strength of at least 0.35 MPa.

131. The method according to any one of paragraphs 116 to 131, wherein the one or more compounds comprising at least two hydrogen atoms that are abstractable in the presence of hydroxyl radicals comprise lignin, tannins, a novolac resin, bis-phenol A, modified phenol formaldehyde resin, humic acid, or any mixture thereof.

132. The method according to any one of paragraphs 116 to 131, wherein the amount of the one or more free radical precursors present when the mixture is heated to at least 60° C. is at least 25% of the one or more free radical precursors combined with the plurality of lignocellulose substrates and the one or more compounds comprising at least two hydrogen atoms that are abstractable in the presence of hydroxyl radicals.

133. A composite product, comprising: an at least partially cured composition having a density less than 1 g/cm$^3$ and an internal bond strength of at least 0.35 MPa, wherein the composition, prior to curing, comprises a plurality of lignocellulose substrates, one or more free radical precursors, and one or more compounds comprising at least two hydrogen atoms that are abstractable in the presence of hydroxyl radicals.

134. The composite product according to paragraph 133, wherein the internal bond strength of the composite product is at least 0.4 MPa.

135. The composite product according to paragraph 133, wherein the internal bond strength of the composite product is at least 0.45 MPa.

136. The composite product according to paragraph 133, wherein the internal bond strength of the composite product is at least 0.5 MPa.

137. The composite product according to any one of paragraphs 133 to 136, wherein the composite product has an internal bond strength of at least 0.4 MPa and a density of less than 0.9 g/cm$^3$.

138. The composite product according to any one of paragraphs 133 to 137, wherein the composite product has an internal bond strength of at least 0.4 MPa and a density of less than 0.85 g/cm$^3$.

139. The composite product according to any one of paragraphs 133 to 138, wherein the composite product has an internal bond strength of at least 0.4 MPa and a density of less than 0.8 g/cm$^3$.

140. The composite product according to any one of paragraphs 133 to 139, wherein the composite product has an internal bond strength of at least 0.4 MPa and a density of less than 0.75 g/cm$^3$.

141. The composite product according to any one of paragraphs 133 to 140, wherein the composite product has an internal bond strength of at least 0.5 MPa and a density of less than 0.9 g/cm$^3$.

142. The composite product according to any one of paragraphs 133 to 141, wherein the density of the composite product is less than about 0.9 g/cm$^3$.

143. The composite product according to any one of paragraphs 133 to 142, wherein the density of the composite product is less than about 0.85 g/cm$^3$.

144. The composite product according to any one of paragraphs 133 to 143, wherein the density of the composite product is less than about 0.8 g/cm$^3$.

145. The composite product according to any one of paragraphs 133 to 144, wherein the density of the composite product is less than about 0.75 g/cm$^3$.

146. A method for making a composite product, comprising: combining a plurality of lignocellulose substrates and one or more free radical precursors to produce a mixture of the lignocellulose substrates and the one or more free radical precursors; maintaining the mixture at a temperature less than 60° C. for at least 10 minutes while retaining at least 11 wt % of the one or more free radical precursors charged to the mixture; and then heating the mixture comprising at least 11 wt % of the one or more free radical precursors charged to the mixture to a temperature of at least 60° C. to about 300° C. to produce a composite product having a density less than 1 g/cm$^3$ and an internal bond strength of at least 0.35 MPa.

147. The method according to paragraph 146, wherein the mixture is maintained at the temperature less than 60° C. for at least 20 minutes while retaining at least 25 wt % of the one or more free radical precursors charged to the mixture, and wherein the mixture comprising at least 25 wt % of the one or more free radical precursors charged to the mixture is heated to the temperature of at least 60° C. to about 300° C. to produce the composite product.

148. The method according to paragraph 146 or 147, wherein the mixture is maintained at a temperature less than 60° C. for at least 30 minutes while retaining at least 11 wt % of the one or more free radical precursors charged to the mixture.

149. The method according to any one of paragraphs 146 to 148, wherein the composite product is in the form of a panel having an average thickness, and wherein the mixture is heated to the temperature of at least 60° C. to about 300° C. for about 3 seconds to about 20 seconds per millimeter of the average thickness.

150. The method according to any one of paragraphs 146 to 149, wherein, prior to heating the mixture comprising at least 11 wt % of the one or more free radical precursors charged to the mixture to the temperature of at least 60° C. to about 300° C. to produce the composite product, an amount of energy generated from the mixture due to any exothermic reaction is less than 20 cal/g.

151. The method according to any one of paragraphs 146 to 150, wherein the composite product has an internal bond strength of at least 0.5 MPa and a density of less than 0.9 g/cm$^3$.

152. The method according to any one of paragraphs 146 to 152, wherein the one or more free radical precursors comprise a mixture of one or more oxidants and one or more catalysts.

153. The method according to any one of paragraphs 146 to 153, wherein the one or more free radical precursors comprises a mixture of hydrogen peroxide and one or more iron containing catalysts.

154. The method according to paragraph 153, wherein an amount of the one or more iron containing catalysts present in the mixture is from about 0.05 wt % to about 5 wt %, based on a dry weight of the plurality of lignocellulose substrates.

155. The method according to any one of paragraphs 146 to 154, wherein the one or more free radical precursors comprise one or more catalysts, and wherein the one or more catalysts comprise one or more metals in the form of a complex bound to one or more complexing agents.

156. The method according to paragraph 155, wherein the one or more complexing agents comprise cyanide (CN$^-$), sulfate (SO$_4^{2-}$), ethylenediaminetetraacetic acid (EDTA), ethylenediamine-N,N'-disuccinic acid (EDDS), ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof.

157. The method according to any one of paragraphs 146 to 156, wherein the one or more free radical precursors comprise one or more catalysts and one or more oxidants, and wherein the one or more catalysts comprise potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

158. The method according to any one of paragraphs 146 to 157, wherein the one or more free radical precursors comprise hydrogen peroxide.

159. The method according to any one of paragraphs 146 to 158, further comprising combining one or more polyphenolic compounds with the plurality of lignocellulose substrates and the one or more free radical precursors to produce the mixture, wherein the one or more polyphenolic compounds comprise lignin, tannins, a novolac resin, modified phenol formaldehyde resin, bis-phenol A, humic acids, or any mixture thereof.

160. A method for making a composite product, comprising: combining a plurality of lignocellulose substrates, one or more free radical precursors, and one or more compounds comprising at least two hydrogen atoms that are abstractable in the presence of hydroxyl radicals to produce a mixture; and heating the mixture comprising at least 11 wt % of the one or more free radical precursors charged to the mixture to a temperature of at least 60° C. to about 300° C. to produce a composite product.

161. The method according to paragraph 160, wherein the mixture is maintained at a temperature less than 60° C. for at least 10 minutes prior to heating the mixture comprising at least 11 wt % of the one or more free radical precursors charged to the mixture to the temperature of at least 60° C. to about 300° C., and wherein the composite product has a density less than 1 g/cm$^3$ and an internal bond strength of at least 0.35 MPa.

162. The method according to paragraph 160 or 161, wherein the one or more compounds comprising at least two hydrogen atoms that are abstractable in the presence of hydroxyl radicals comprise lignin, tannins, a novolac resin, bis-phenol A, modified phenol formaldehyde resin, humic acid, or any mixture thereof.

163. The method according to any one of paragraphs 160 to 162, wherein the mixture comprises at least 20 wt % of the one or more free radical precursors charged to the mixture when heated to the temperature of at least 60° C. to about 300° C. to produce the composite product.

164. The method according to any one of paragraphs 160 to 163, wherein the one or more free radical precursors comprise one or more catalysts and one or more oxidants, and wherein the one or more catalysts comprise potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
combining a plurality of lignocellulose substrates and one or more free radical precursors comprising a catalyst and an oxidant to produce a mixture of the lignocellulose substrates and the one or more free radical precursors;
maintaining the mixture at a temperature less than 60° C. for at least 10 minutes while retaining at least 11 wt % of the oxidant charged to the mixture; and then
heating the mixture comprising at least 11 wt % of the oxidant charged to the mixture to a temperature of at least 60° C. to about 300° C. to produce a composite product having a density less than 1 g/cm$^3$ and an internal bond strength of at least 0.35 MPa.

2. The method of claim 1, wherein the mixture is maintained at the temperature less than 60° C. for at least 20 minutes while retaining at least 25 wt % of the oxidant charged to the mixture, and wherein the mixture comprising at least 25 wt % of the oxidant charged to the mixture is heated to the temperature of at least 60° C. to about 300° C. to produce the composite product.

3. The method of claim 1, wherein the mixture is maintained at the temperature less than 60° C. for at least 30 minutes while retaining at least 11 wt % of the oxidant charged to the mixture.

4. The method of claim 1, wherein the composite product is in the form of a panel having an average thickness, and wherein the mixture is heated to the temperature of at least 60° C. to about 300° C. for about 3 seconds to about 20 seconds per millimeter of the average thickness.

5. The method of claim 1, wherein, prior to heating the mixture comprising at least 11 wt % of the oxidant charged to the mixture to the temperature of at least 60° C. to about 300° C. to produce the composite product, an amount of energy generated from the mixture due to any exothermic reaction is less than 20 cal/g.

6. The method of claim 1, wherein the composite product has an internal bond strength of at least 0.5 MPa and a density of less than 0.9 g/cm$^3$.

7. The method of claim 1, wherein the oxidant comprises hydrogen peroxide.

8. The method of claim 1, wherein the oxidant comprises hydrogen peroxide and the catalyst comprises one or more iron containing catalysts.

9. The method of claim 8, wherein an amount of the one or more iron containing catalysts present in the mixture is from about 0.05 wt % to about 5 wt %, based on a dry weight of the plurality of lignocellulose substrates.

10. The method of claim 1, wherein the catalyst comprises one or more metals in the form of a complex bound to one or more complexing agents.

11. The method of claim 10, wherein the one or more complexing agents comprise cyanide, sulfate, ethylenediaminetetraacetic acid (EDTA), ethylenediamine-N,N'-disuccinic acid (EDDS), ethyleneglycol-bis(2-aminoethyl)-N,N,N',N'-tetraacetic acid (EGTA), diethylenetriaminepentaacetic acid (DTPA), trans-1,2-diaminocyclohexane tetraacetic acid (CDTA), iminodisuccinate (IDS), nitrilotriacetic acid (NTA), or any mixture thereof.

12. The method of claim 1, wherein the catalyst comprises potassium ferricyanide, an iron complex of ethylenediaminetetraacetic acid, an iron complex of (S,S')-ethylenediamine-N,N'-disuccinic acid, an iron complex of diethylentriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

13. The method of claim 1, wherein the mixture is maintained at the temperature less than 60° C. for at least 20 minutes while retaining at least 35 wt % of the oxidant charged to the mixture, and wherein the mixture comprising at least 35 wt % of the oxidant charged to the mixture is heated to the temperature of at least 60° C. to about 300° C. to produce the composite product.

14. The method of claim 1, further comprising combining one or more polyphenolic compounds with the plurality of lignocellulose substrates and the one or more free radical precursors to produce the mixture, wherein the one or more polyphenolic compounds comprise lignin, tannins, a novolac resin, modified phenol formaldehyde resin, bis-phenol A, humic acids, or any mixture thereof.

15. A method for making a composite product, comprising:
combining a plurality of lignocellulose substrates, one or more free radical precursors comprising a catalyst and an oxidant, and one or more compounds comprising at least two hydrogen atoms that are abstractable in the presence of hydroxyl radicals to produce a mixture; and
heating the mixture comprising at least 11 wt % of the oxidant charged to the mixture to a temperature of at least 60° C. to about 300° C. to produce a composite product.

16. The method of claim 15, wherein the mixture is maintained at a temperature less than 60° C. for at least 10 minutes prior to heating the mixture comprising at least 11 wt % of the oxidant charged to the mixture to the temperature of at least 60° C. to about 300° C., and wherein the composite product has a density less than 1 g/cm$^3$ and an internal bond strength of at least 0.35 MPa.

17. The method of claim 15, wherein the one or more compounds comprising at least two hydrogen atoms that are abstractable in the presence of hydroxyl radicals comprise lignin, tannins, a novolac resin, bis-phenol A, modified phenol formaldehyde resin, humic acid, or any mixture thereof.

18. The method of claim 15, wherein the mixture comprises at least 20 wt % of the oxidant charged to the mixture when heated to the temperature of at least 60° C. to about 300° C. to produce the composite product.

19. The method of claim 15, wherein the catalyst comprises potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

20. A method for making a composite product, comprising:

combining a plurality of lignocellulose substrates and one or more free radical precursors comprising one or more iron containing catalysts and hydrogen peroxide to produce a mixture; and heating the mixture comprising at least 11 wt % of the hydrogen peroxide charged to the mixture to a temperature of at least 60° C. to about 300° C. to produce a composite product, wherein:

the one or more iron containing catalysts are present in the mixture in an amount of about 0.05 wt % to about 5 wt %, based on a dry weight of the plurality of lignocellulose substrates, and the one or more iron containing catalysts comprise potassium ferricyanide, an iron complex of ethylenediaminetetraacetic acid, an iron complex of (S,S')-ethylenediamine-N,N'-disuccinic acid, an iron complex of diethylenetriamine pentaacetic acid, an iron complex of ethyleneglycol-bis(2-aminoethyl)-N,N,N',N'-tetraacetic acid, an iron complex of trans-1,2-diaminocyclohexanetetraacetic acid, or any mixture thereof.

* * * * *